US009993107B2

(12) United States Patent
Blanc et al.

(10) Patent No.: US 9,993,107 B2
(45) Date of Patent: Jun. 12, 2018

(54) ASSEMBLY FOR A MACHINE FOR MAKING INFUSED BEVERAGES

(75) Inventors: Jean-Pierre Blanc, Nice (FR); Alain Goering, Nice (FR)

(73) Assignee: Compagnie Mediterraneenne Des Cafes, Carros (FR)

(*) Notice: Subject to any disclaimer, the term of this patent is extended or adjusted under 35 U.S.C. 154(b) by 666 days.

(21) Appl. No.: 13/699,551

(22) PCT Filed: May 25, 2011

(86) PCT No.: PCT/EP2011/058388
§ 371 (c)(1),
(2), (4) Date: Feb. 6, 2013

(87) PCT Pub. No.: WO2011/147790
PCT Pub. Date: Dec. 1, 2011

(65) Prior Publication Data
US 2013/0133523 A1     May 30, 2013

(30) Foreign Application Priority Data
May 25, 2010  (FR) ...................................... 10 54010

(51) Int. Cl.
*A47J 31/44*     (2006.01)
*A47J 31/36*     (2006.01)

(52) U.S. Cl.
CPC ........... *A47J 31/4403* (2013.01); *A47J 31/36* (2013.01); *A47J 31/446* (2013.01); *Y10T 29/49826* (2015.01)

(58) Field of Classification Search
CPC ............................. A47J 31/36; A47J 31/4403
See application file for complete search history.

(56) References Cited

U.S. PATENT DOCUMENTS 5,144,886 A    9/1992  Goeckelmann et al.
5,642,656 A *  7/1997  Braendle ......................... 99/295
(Continued)

FOREIGN PATENT DOCUMENTS

WO    WO 2008142040 A1 * 11/2008

OTHER PUBLICATIONS

English translation of European Patent Office Written Opinion for International Patent Application No. PCT/EP2011/058368, Filed May 23, 2011, Applicant, Compagnie Mediterraneenne Des Cafes (8 pages).
(Continued)

*Primary Examiner* — David Angwin
*Assistant Examiner* — John J Norton
(74) *Attorney, Agent, or Firm* — McCracken & Gillen LLC

(57) ABSTRACT

The present invention relates to an assembly formed by a removable infusion unit and the supporting or locking elements thereof, for a machine for preparing beverages by extraction of a product to be infused. The assembly includes a receptacle intended to be rigidly connected to the machine and configured to removably receive the infusion unit. The assembly also includes a device for locking the unit onto the receptacle and an actuation device supported by either the unit or the receptacle and which controls the locking device and is arranged such that in a position in which the actuation device is deactivated, the locking device prevents the unit from being disconnected from the receptacle, and in a position in which the actuation device is activated, the locking device allows the unit to be disconnected from the receptacle.

The invention is suitable for use in machines for preparing EXPRESSO-type beverages by extracting a product to be infused.

14 Claims, 22 Drawing Sheets

(56) References Cited

U.S. PATENT DOCUMENTS

| | | | | |
|---|---|---|---|---|
| 5,755,149 | A * | 5/1998 | Blanc et al. | 99/289 T |
| 6,904,840 | B1 | 6/2005 | Pfeifer et al. | |
| 2005/0247204 | A1* | 11/2005 | Lafond et al. | 99/279 |
| 2007/0151459 | A1 | 7/2007 | Magg et al. | |
| 2008/0173181 | A1* | 7/2008 | Startz | 99/279 |
| 2008/0236403 | A1* | 10/2008 | Cortese | 99/323 |
| 2010/0159108 | A1* | 6/2010 | Blanc et al. | 426/590 |

OTHER PUBLICATIONS

International Search Report from the European Patent Office dated Jul. 27, 2011, for International Patent Application No. PCT/EP2011/058388, Filed May 23, 2011, Applicant, Compagnie Mediterraneenne Des Cafes. (2 pages).

European Patent Office Written Opinion for International Patent Application No. PCT/EP2011/058388, Filed May 23, 2011, Applicant, Compagnie Mediterraneenne Des Cafes. (7 pages).

* cited by examiner

ASSEMBLY FOR A MACHINE FOR MAKING INFUSED BEVERAGES

TECHNICAL FIELD

The present invention relates to an assembly formed by a removable infusion unit and the supporting or locking elements thereof, for a machine for preparing beverages by means of the extraction of a product to be infused.

More specifically, the invention is suitable for use in the field of EXPRESSO-type coffee machines. The invention may also be used for making beverages using other materials such as tea. It will be particularly suitable for use in the field of machines for making beverages by means of infusion of a product contained in a dose.

BACKGROUND

In a known manner, said machines include an infusion unit providing the extraction of a product such as coffee. An infusion unit usually comprises an extraction chamber that is sealed during the extraction phase and capable of being opened in order to receive or release the product that is being used for the infusion. The outlet of the chamber leads into a receptacle such as a cup. The inlet of the chamber is intended to be fluidly connected to a boiler. The infusion unit generally includes a cylinder which activates the opening and closing of the chamber. The unit thus includes numerous members and numerous fluidic connections. Such a machine is known, for example, from document WO-A-2008/142040.

In numerous machines, the unit is attached to the frame of the machine in a non-removable manner. The dismounting of machines is therefore rendered very difficult or even impossible. Therefore, said machines cannot be easily repaired or recycled at end-of-life. They do not meet eco-design requirements which impose the dismantling and recycling of machines.

Other machines have designs which enable the infusion unit to be dismantled from the frame. Said machines use a significant number of removable attachment members such as screws and nuts. The installation of said members, both during the assembly of the unit and during the dismounting, induces a relatively significant number of steps and time necessary for the mounting and dismantling of the machine. The manufacturing and recycling costs are therefore relatively high. For economic reasons, it is consequently not possible to dismantle said end-of-life units.

Thus, there is a constant need to propose a machine for preparing beverages having a facility to dismantle the assembly thereof supporting the infusion unit in the aim of the cleaning thereof, the maintenance thereof and/or for the end-of-life dismantling thereof, without any satisfactory solution having already been proposed until now for the resolution of said need.

The aim of the present invention is to meet said need.

SUMMARY

To this effect, it is envisaged according to the invention an assembly for a machine for preparing beverages by extraction of a product to be infused, including an infusion unit for the product to be infused at least equipped with an extraction chamber and a device for opening and closing the extraction chamber, characterised in that said assembly includes a receptacle or container intended to be rigidly connected to the machine and configured to removably receive the infusion unit, in that said assembly includes a device or means for locking the unit onto the receptacle and actuation device or means which are supported by either the unit or the receptacle and which control the locking means or device and in that said assembly is arranged such that:

in a position in which the actuation means or device are deactivated, the locking means or device prevent the unit from being disconnected from the receptacle, in a position in which the actuation means or device are activated, the locking means or device allow the unit to be disconnected from the receptacle.

The technical effect obtained is a simplified mounting and dismounting of the infusion unit from the assembly thereof. This procures a maintenance facility as well as a possibility of end-of-life dismantling of the machine supporting said unit, at a reasonable cost.

The invention also relates to a machine for preparing beverages by device or means of the extraction of a product to be infused, characterised in that it includes such an assembly.

Another embodiment of the invention relates to a method for assembling an assembly according to any one of the preceding features including the following steps: the actuation device or means are activated; the unit is placed on or in the receptacle; the actuation device or means are deactivated such that the locking device or means prevent the unit from being disconnected from the receptacle.

Another embodiment of the invention relates to a method for disassembling an assembly according to any one of the preceding features including the following steps: the actuation device or means are activated such that the locking device or means allow the unit to be disconnected from the receptacle. Preferably, said activation step is performed by acting on the control element with a hand. The unit is grasped. Preferably, said gasping step is performed by grasping the gripping member with said same hand. The unit is disconnected from the receptacle.

The advantage procured by the presence of actuation device or means for the activation of the locking or unlocking of the locking device or means is that said actuation device or means can be rendered more easily accessible to an operator than would be the locking device or means which are mainly housed between an infusion unit and a receptacle and therefore difficult to access.

Another advantage of the present invention is the possibility of combining the actuation device or means with the device or means for moving the infusion unit out of the receptacle thereof.

Another advantage of the present invention is to use elements already provided for producing another function in the infusion unit in order to produce a portion of the locking device or means.

BRIEF DESCRIPTION OF THE DRAWINGS

Other features, aims and advantages of the present invention will appear upon reading the following detailed description and referring to the appended drawings given as non-limiting examples and wherein.

DETAILED DESCRIPTION

Figure 1:
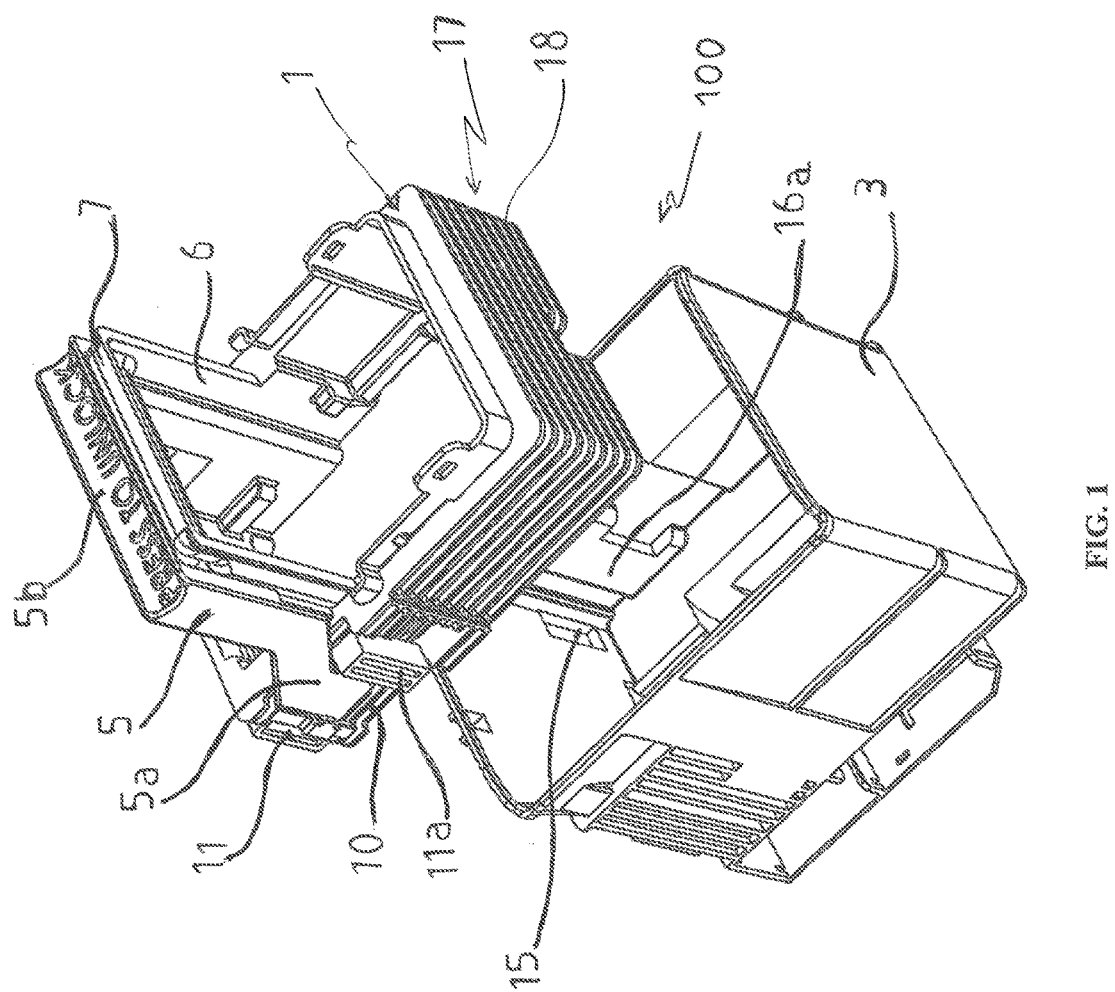
FIG. 1 is a perspective top view according to a first angle of view of an example of an assembly according to the present invention formed by a removable infusion unit intended to be received inside a receptacle, the infusion unit being shown spaced from the receptacle thereof.

Before describing the invention in further details some optional but advantageous features will be mentioned. These features can be used alone or in combination.

Optionally, the invention further includes at least any one of the following features:
- the extraction chamber includes two half-chambers capable of being mutually moved closer or farther apart for respectively closing or opening the extraction chamber such as to clasp the product to be infused or to be able to allow said product to escape outside of the chamber. Thus, the infusion unit includes the half-chambers.
- the unit includes actuation means or device configured for acting on at least one of the two half-chambers such as to move closer and/or farther apart the two half-chambers. Typically, the actuation means or device include at least either one of the following elements: a cylinder, a knuckle joint, a cam, an actuating handle. Thus, a user does not need to directly grasp one of the two half-chambers in order to move said half-chamber closer or farther apart from the other half-chamber. In particular, the insertion of the product to be infused or the removal thereof from the chamber does not require one of the two half-chambers to be disconnected from the rest of the unit. The assembly according to the invention thus preferentially forms part of an automatic or semi-automatic machine.

the locking means or device include at least one locking member, hinged onto either one of the unit or the receptacle and being configured to engage with a complementary locking member supported by either one of the unit or the receptacle, the engagement of the locking member with the associated complementary locking member preventing the unit from being disconnected from the receptacle.

a locking member forming a bolt is supported by the unit whereas the complementary locking member(s) thereof forming strikes are supported by the receptacle. This has the advantage of having a safe and economical locking system for the locking or unlocking of the infusion unit, said system being simple to produce.

the locking means or device include at least two locking members forming bolts and at least one complementary locking member forming a strike for each locking member forming a bolt, the complementary locking member being in the form of a housing receiving the locking member forming a bolt in locking position. This has the advantage of balancing the locking force exerted on the infusion unit by rendering said force advantageously symmetrical in relation to said unit.

two housings are provided for each locking member forming a bolt. The resulting advantage is a locking action that is more solid and distributed in two places.

the unit includes at least one hydraulic connector and the receptacle includes at least one complementary connector to provide the hydraulic supply of the unit. Typically, said connector provides the water supply of the extraction chamber. Said connector may also provide the water supply of a cylinder supported by the unit. Preferably, a pump is arranged upstream of the unit. Said pump enables the unit to be supplied with pressurised fluid. The connector of the unit and the complementary connector of the receptacle are shaped to define a thrust direction for a pressurised fluid injected into the unit. Typically, for a substantially cylindrical connector, the thrust direction is parallel to the axis of the cylinder. Advantageously, the locking member and complementary locking member are configured such that the thrust force exerted on the unit during the injection of the pressurised fluid tends to move closer the locking member and the complementary locking member, thus providing the rigid connection of the unit to the receptacle. Preferably, the at least one locking member is configured to slide in a direction perpendicular to said thrust direction. Thus, said locking member opposes the disconnection of the unit when exposed to the thrust force.

the assembly is configured to be supplied with pressurised fluid and such that the pressurised fluid supply generates on the unit a thrust force in a thrust direction. The assembly further being shaped so that the locking member and the complementary locking member engage such that said thrust force tends to move closer the locking member and the complementary locking member, therefore preventing the unit from being disconnected from the receptacle when exposed to the thrust force. The locking device or means thus provide a locking function and an effective holding in position function when exposed to the thrust force.

the unit includes a peripheral belt surrounding the infusion chamber and the device for closing and opening the infusion chamber, said peripheral belt supporting the two locking members forming bolts arranged symmetrically on the belt. The advantage conferred is to include the locking members in the belt which makes it possible to prevent the space requirement of the infusion unit from increasing.

the locking members forming bolts are slidably mounted onto the belt. A sliding motion enables an easy and safe locking action to be produced.

the belt includes ribs extending in the sliding direction and the locking member forming a bolt includes raised patterns that are complementary to the ribs and configured to provide the translational guidance of said member on the belt. The sliding on ribs enables better guidance of the member. Moreover, said ribs may have another function, for example, the function of reinforcing the belt, and thus said ribs enable two functions to be achieved with a single element.

the actuation device or means of the assembly are configured to be activated manually by the operator, preferably with a single hand.

in unlocking position of the locking device or means, the unit can be manually separated from the receptacle. This procures easy handling of the infusion unit by an operator without involving the use of specific tools.

the actuation device or means are supported by the unit and include a manual control element such as a handle or a button intended to be pulled, pressed or rotated, said control element being hinged onto the unit and configured to participate, at least partially, in the gripping of the unit in view of the separation thereof from the receptacle. A control element in the form of a handle or a button enables the locking device or means to be easily activated by the operator.

the control element is a handle configured to be moved during the actuation thereof and including an inclined surface arranged to engage with an inclined surface supported by the associated locking device or means such that the movement of the handle results in a movement of the locking device or means. The engagement between inclined surfaces, one of which forms a ramp for the movement of the other thereon enables the locking device or means to be activated by the control element without requiring intermediate elements.

the handle is slidably mounted onto the unit.

the assembly is configured such that a sliding of the handle results in a sliding of the associated locking device or means in a direction perpendicular to that of the handle. This has the advantage of making it possible to enable the locking device or means to slide in a horizontal plane whereas the handle slides in a vertical plane, which is the most suitable sliding for a handle.

a gripping member is attached to the unit and shaped such that a user can grasp simultaneously and with a single hand the control element and the gripping member. Thus, the actuation device or means can also produce the removal of the infusion unit out of the receptacle and perform a second function, which represents a simplification of the device or means implemented for the removal of the unit by the reuse of other device or means already present on the unit.

the unit is arranged such that a pressure applied on the control element allows the unit to be disconnected from the receptacle and that a tension exerted on the gripping member separates the unit from the receptacle. Thus, the actuation device or means are operational by pressure and the device or means for removing the infusion unit from the receptacle are operational by tension, said two motions being particularly appropriate for a control element such as a handle, the motion by tension also being the most suitable motion for removing the infusion unit from the receptacle receiving said unit.

the unit is arranged such that during the passage from locking position to unlocking position, the portion of the control element activated by the operator moves closer to a gripping surface provided on the member. Thus, said two elements forming the removal device or means are at the same level and can be grasped simultaneously by an operator.

the gripping surface forms a complementary additional handle of the control element of the actuation device or means. This makes the motion for removing the infusion unit even easier, the assembly includes return device or means configured to bring the locking device or means or actuation device or means respectively into locking position or deactivation position. Thus, the locking device or means can be used to hold the rigidly connected handle of the infusion unit during the removal thereof and the actuation device or means are ready to provide a new actuation cycle.

the receptacle includes two hydraulic connectors and the unit includes two complementary connectors to provide the hydraulic supply of the group, each connector of the unit being shaped to engage with a connector of the receptacle in order to form two hydraulic connections. The unit is supplied with pressurised fluid by at least one of the connectors thereof. The locking device or means are distributed on either side of the connectors thus preventing the rotation of the unit when exposed to the pressure from the fluid supplying said unit. This increases the stability and the strength of the infusion unit during the hydraulic supply. Preferably, housings supported by the receptacle on either side of the connectors each form a rotational or translational stop for the unit when said connectors engage with a bolt. Advantageously, the housings are supported by the surfaces of the receptacle the farthest away from the axis of symmetry separating the connectors. Similarly, the bolts are supported by the walls of the belts the farthest away from the axis of symmetry separating the complementary connectors. Said arrangement makes it possible to benefit from a good lever effect for opposing the rotation of the unit when exposed to the pressure from the fluid circulating in the connectors.

the assembly comprises removable rigid connection device or means arranged to provide the removable rigid connection therefore to the frame of the machine. Thus, the assembly can also be easily removed from the machine.

Figure 2:
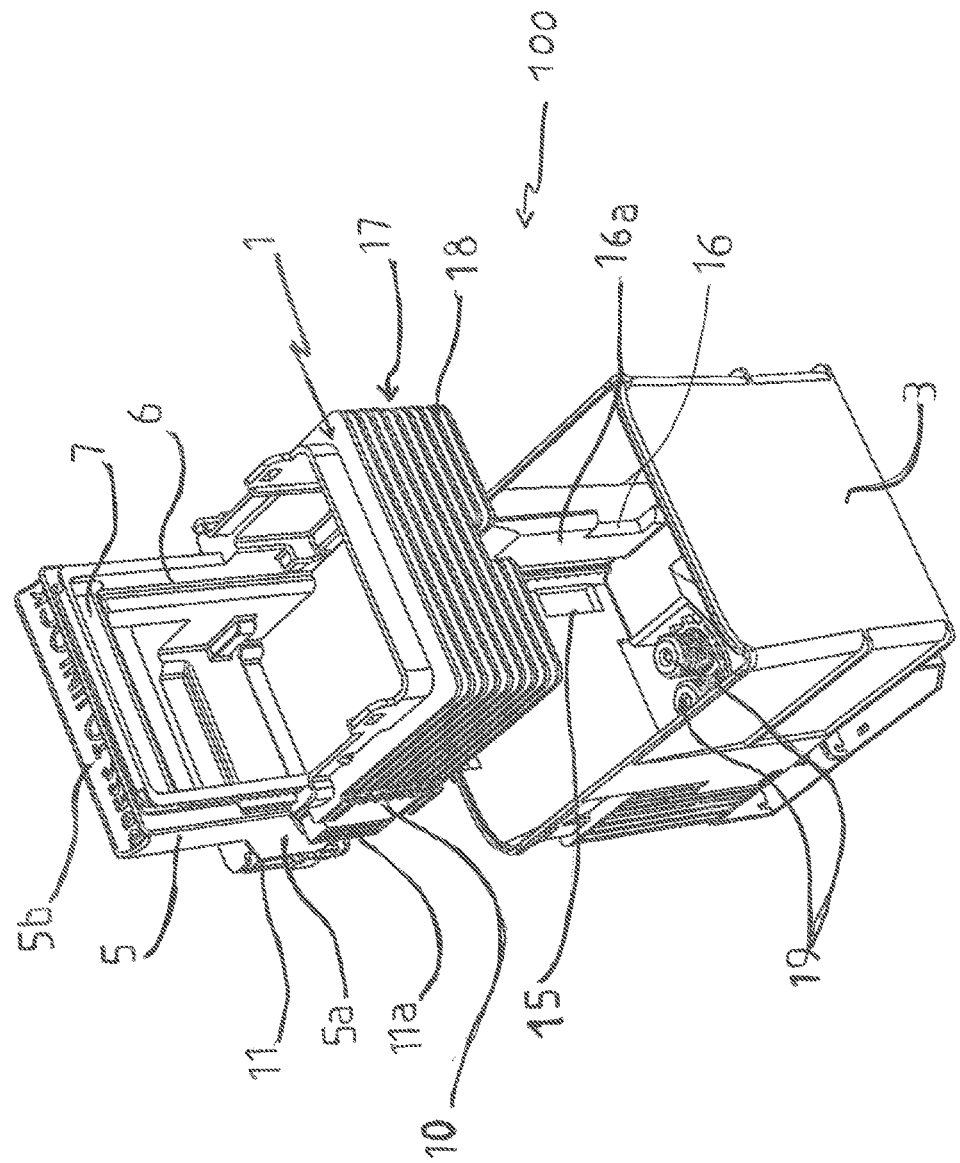
FIG. 2 is a perspective view according to a second angle of the assembly illustrated in FIG. 2.
Figure 3:
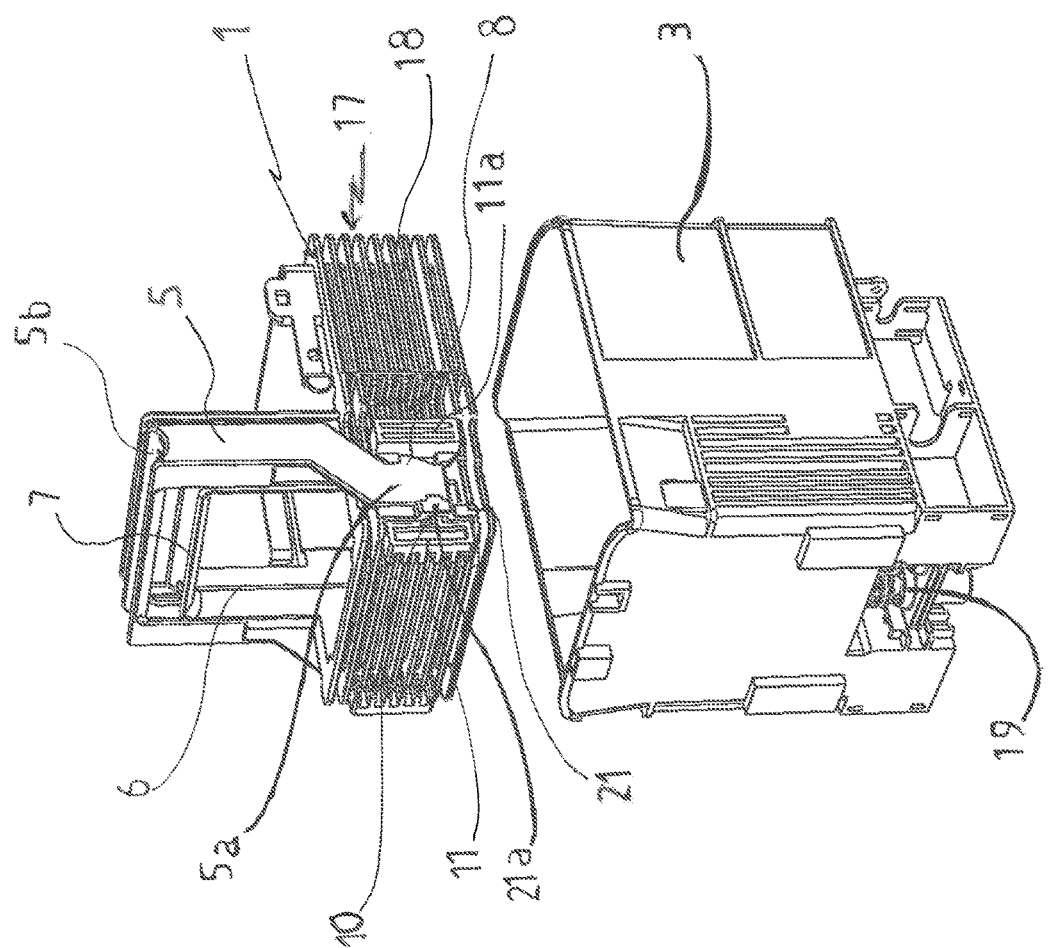
FIG. 3 is a perspective view according to a third angle of the assembly illustrated in FIG. 2.
Figure 4:
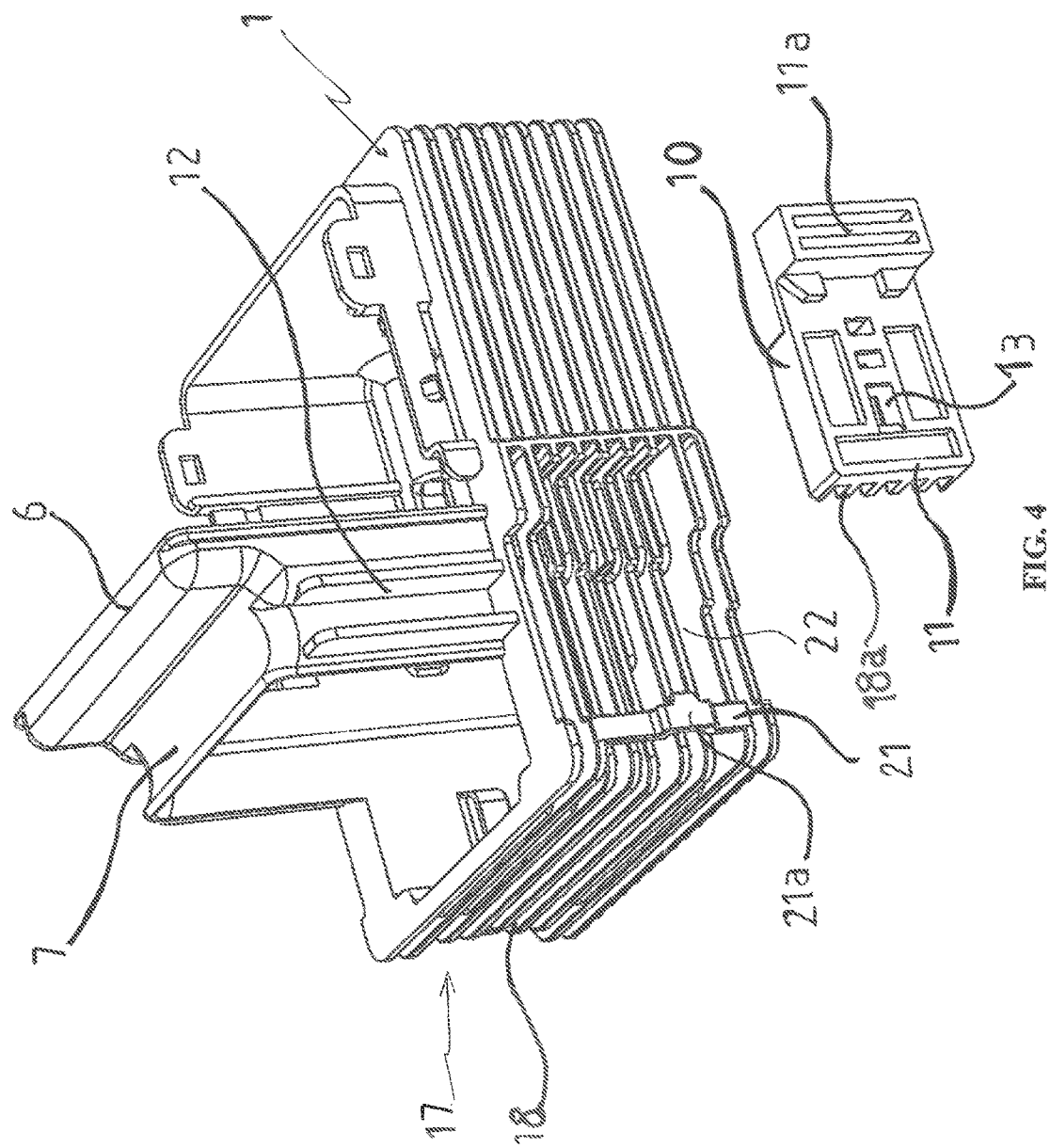
FIG. 4 is a lateral perspective view of an infusion unit forming part of the assembly according to the present invention, said group being equipped with a locking member of said unit onto the receptacle thereof, the locking member being, in said figure, shown spaced from the receiving housing thereof arranged in the infusion unit.
Figure 5:
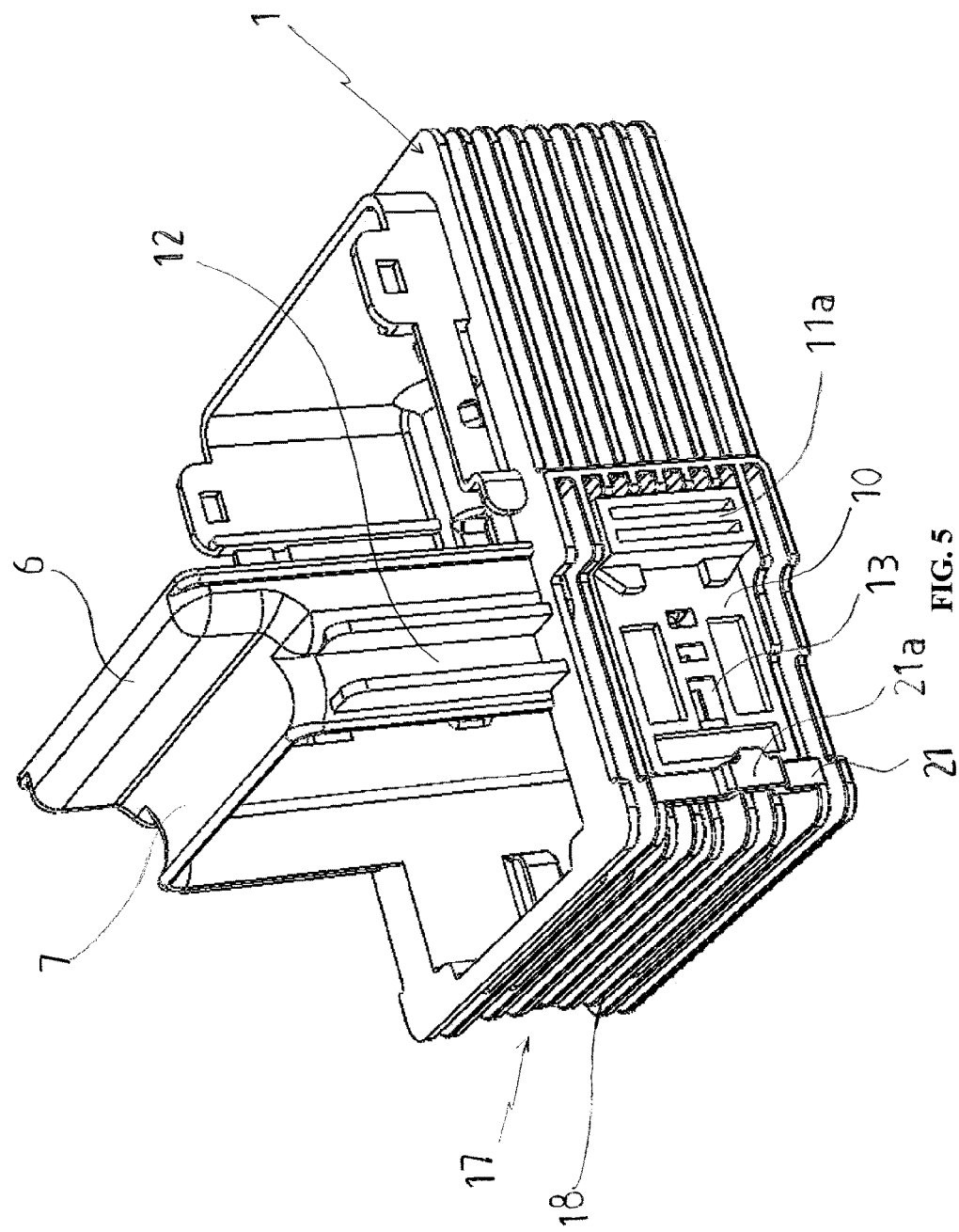
FIG. 5 is a lateral perspective view of an infusion unit forming part of the assembly according to the present invention, said group being equipped with a locking member of said unit onto the receptacle thereof, the locking member being in place in the receiving housing thereof arranged in the infusion unit, this in a first position corresponding to unlocking of the unit from the receptacle thereof.
Figure 6:
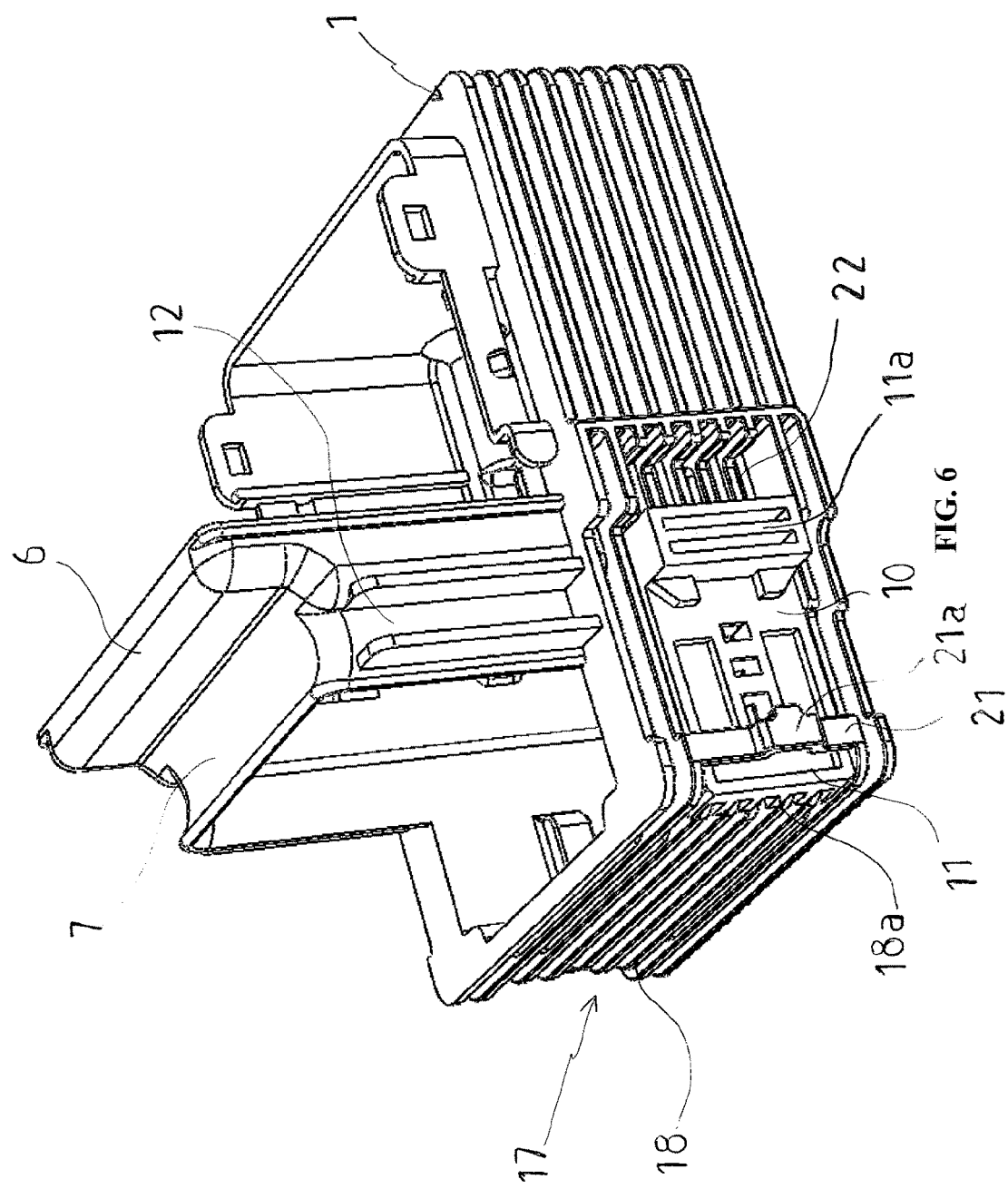
FIG. 6 is a lateral perspective view of the unit illustrated in FIG. 5 in a second intermediate position between rest and locking positions of the unit in relation to the receptacle thereof.

Referring to FIGS. 1 to 19, examples of implementation of the invention have been illustrated for an assembly for a machine for preparing beverages by means of the extraction of a product to be infused. Referring particularly to FIGS. 1 to 3, said assembly 100 includes an infusion unit 1 and a receptacle 3 that may house the infusion unit 1. Said receptacle 3 of the assembly 100 is thus used as a support element for the infusion unit 1 in the same manner as the pressurised hot water supply element, the assembly 100 acting as the receiving base for the infusion unit 1.

The infusion unit 1 may be at least equipped with an extraction chamber and a device for opening and closing the chamber, where said chamber and said device are received in the hollow inner space 2 of the infusion unit 1.

The extraction chamber 47 inside the infusion unit may consist of a fixed infusion half-chamber 32 against which rests a mobile infusion half-chamber 42 driven in translation by a hydraulic cylinder also providing the sealed closing of the chamber 47 during the phase for infusing the product trapped between both half-chambers 32,42, said infusion being carried out under high pressure. The product is advantageously contained in a dose, said dose taking, for example, the form of a pod. Reference will be made to the document WO-A-2008/142040 for the description of such a machine for preparing beverages, and the corresponding English-language publication, U.S. Application Publication No. 2010/0159108 A1 is also hereby incorporated by reference herein.

The present invention applies whatever the type of dose. In particular, the invention applies to doses having a flexible external shell, to doses having a rigid capsule-type external shell, to doses the external shell of which is capable of disappearing at least partially during the infusion, by dissolution for example. The invention again applies to doses formed from a product to be infused aggregated by a binder and/or by the application of a pressure. Such a dose formed from a product aggregate to be infused such as coffee can be constituted outside of the machine or be constituted by a dedicated module of the machine.

During the infusion of the product, the hydraulic system is subject to a vertical thrust proportional to the projected surface thereof and to the pressure of the water which passes through said system. Said vertical hydraulic pressure is, for example, very high during the infusion of expresso coffee which requires a pressure greater than 8 bars or even greater than 15 bars or 20 bars.

It is advisable to provide holding of the removable infusion unit 1 therefore placed in the receptacle 3 against the high pressure hydraulic thrust during the infusion and/or the thrust phase of the cylinder, without increasing the volume thereof or resorting to the use of metal parts. Said holding of the infusion unit 1 in the machine requires the forces to be taken up by a robust fastening assembly which must nevertheless remain easy to handle by the end user of the machine. Furthermore, said holding must not increase the space requirement of the infusion unit 1 or hinder the assembly thereof or the disassembly thereof from the receptacle 3.

For this purpose, a belt 17 is provided advantageously closed surrounding the outer periphery of the infusion unit 1. Said belt 17 is advantageously made exclusively from engineered plastic material and comprises reinforcement ribs 18 along the perimeter thereof to support the enormous stresses during the infusion at over 20 bars. Said ribs 18 advantageously extend on each side of the belt 17 lengthwise of said side.

For the present invention, the infusion unit 1 is rendered removable from the receptacle 3 in order to provide the cleaning thereof, the maintenance thereof or the end-recycling of the machine containing said infusion unit.

According to the present invention, the receptacle 3 is rigidly connected to the machine for preparing beverages by means of the extraction of a product to be infused and has a hollow inner space 4 which receives the main portion of the infusion unit 1 by surrounding said receptacle around the entire outer perimeter thereof. Associated locking means 10, 15, 16, distributed between the unit 1 and the receptacle 3 are further provided as well as actuation means 5 supported by either one of the unit 1 or the receptacle 3, said actuation means 5 which control the locking means 10, 15 and 16. The locking means can also be called locking device or locking member. The actuation means can also be called actuation device or actuation member. In a position in which the actuation means 5 are deactivated, the locking means 10, 15 and 16 prevent the unit 1 from being disconnected from the receptacle 3 and in a position in which the actuation means 5 are activated, the locking means 10, 15 and 16 allow the unit 1 to be disconnected from the receptacle 3.

The meaning of activation and deactivation of the actuation means 5 will subsequently be explained referring to the interaction of the actuation means with a portion 10 of the locking means 10, 15, 16.

The removability of the infusion unit 1 further requires disconnection of the hydraulic inlets required for operating the cylinder and the infusion chamber included in the infusion unit 1. The disconnection of the hydraulic inlets is performed by means of vertical connectors installed under the infusion unit 1, said connectors 19 being shown in FIG. 2 in the inner space 4 of the receptacle 3 passing through the bottom thereof.

Referring to the various embodiments of the invention, the locking means 10, 15, 16 will now be described first, then the actuation means 5 and finally the interaction of the actuation means with a portion 10 of the locking means 10, 15, 16.

In the following, reference will be made to the lateral sides of the infusion unit 1 to designate the sides on which respectively slide a locking member 10, the front side of the infusion unit 1 for that through which said locking members 10 emerge in locked position of the infusion unit 1. The lower portion of the infusion unit 1 will be the portion rotated towards the receptacle 3 and the closest to the unit. The same applies to the corresponding sides of the receptacle 3. The designations inner or outer for the elements correspond to a place respectively rotated towards or opposite the infusion unit.

In the figures, the locking means include at least one locking member 10, hinged onto either one of the infusion unit 1 or the receptacle 3. Said locking member 10 is supported by the infusion unit 1 and is in the form of a locking member forming a bolt 10. Said locking member forming a bolt 10 is received in a recess 22 made in the belt 17, said member thus being able to be housed in the belt 17 and does not project laterally from the belt 17.

As shown in FIGS. 1 to 3, the locking member forming a bolt 10 is configured to engage with a complementary locking member 15 or 16 supported by the receptacle 3, said complementary member forming a strike. Said complementary locking member forming a strike 15 or 16 may advantageously be in the form of at least one housing 15 or 16 receiving a portion of the locking member forming a bolt 10.

Thus in FIGS. 1 to 3, two locking members forming bolts 10 are provided on the infusion unit 1, only one of which is visible in FIGS. 1 and 2, each of the bolts 10 being associated to a lateral side of the infusion unit 1. Each locking member forming a bolt 10 engages with a housing 15 provided on the receptacle 3, two of which are visible in FIG. 3 and one in FIGS. 1 and 2, said housing 15 producing the locking member forming a strike. It should be noted that in FIGS. 1 and 2, the housing referenced 15 does not engage with the bolt shown in said figure and referenced 10 but with the bolt located on the other lateral side of the infusion unit 1.

In FIGS. 8 to 14, a locking member forming a bolt 10 on each of the lateral sides of an infusion unit 1 is particularly clearly visible for the detail of the component elements thereof.

The unit includes at least one hydraulic connector and the receptacle includes at least one complementary connector to provide the hydraulic supply of the unit. Typically, said connector provides the water supply of the extraction chamber. Said connector may also provide the water supply of a cylinder supported by the unit. Preferably, a pump is arranged upstream of the unit. Said pump enables the unit to be supplied with pressurised fluid. The connector of the unit and the complementary connector of the receptacle are shaped to define a thrust direction for a pressurised fluid injected into the unit. Typically, for a substantially cylindrical connector, the thrust direction is parallel to the axis of the cylinder. In FIG. 2, two complementary connectors 19, 19 are shown. They each define a substantially vertical thrust direction. Advantageously, the locking member and complementary locking member are configured such that the thrust force exerted on the unit during the injection of the pressurised fluid tends to move closer the locking member and the complementary locking member, thus providing the rigid connection of the unit to the receptacle. Preferably, the at least one locking member is configured to slide in a direction perpendicular to said thrust direction. In the figures, the locking member 10 slides in a substantially horizontal direction. Thus, said locking member opposes the disconnection of the unit when exposed to the thrust force.

Referring again to FIG. 2, in the case of locking by means of a bolt 10 and a strike 15, it is the front portion 11 of the bolt 10 which penetrates during the movement thereof into the associated housing, not shown in FIG. 1 and arranged symmetrically on the other lateral side of the receptacle 3 to the housing 15.

As visible in FIG. 1, a second locking member forming a strike 16 may be provided on the receptacle 3, said second strike 16 being arranged on a lateral wall of the receptacle 3. Said second strike 16 is produced by a cut-out forming a housing 16 for a portion of the locking member forming a bolt 10, said cut-out being produced in a component 16a used as a stop lateral to the locking member forming a bolt 10 when said member is in locking position. Advantageously, it is a portion 11a of the bolt 10 projecting laterally from the bolt 10 which abuts in the component 16a, against the contours of the housing 16 after penetrating into said housing 16 configured to the dimensions thereof. Once again, as for the housing 15, the housing 16 is not associated to the bolt referenced 10 in said figure but to the bolt located on the other lateral side of the infusion unit 1.

Thus, the engagement of the locking member forming a bolt 10 with the associated complementary locking member forming a strike 15 or 16 produces the rigid connection of the infusion unit 1 in relation to the receptacle 3 and prevents the disconnection thereof whilst the locking member forming a bolt 10 is held in position in the complementary locking member forming a strike 15 or 16. It is possible to use only a housing forming a strike 15 or 16 on the receptacle 3 or use the two housings 15 or 16 simultaneously to produce the locking of the infusion unit 1 onto the receptacle 3.

As regards the movement of a locking member 10 supported by the infusion unit 1 on said unit 1, said movement occurs by sliding the member 10 along the exterior of a lateral side of said unit 1 but this is not necessarily always the case.

As previously mentioned, the infusion unit 1 may include a peripheral belt 17 defining the inner space 2 thereof receiving the infusion chamber and the device for closing and opening the infusion chamber. It is advantageous that said peripheral belt 17 supports at least the locking member or members 10 associated to the infusion unit 1, said members being arranged symmetrically on the belt 17.

For this purpose, the belt 17 includes longitudinal ribs 18 extending in the sliding direction and the locking member forming a bolt 10 includes on the inner face thereof rotated towards the belt 17 complementary raised patterns 18a of the ribs 18 and configured to provide the translational guidance of said member 10. Said complementary profiles 18a may, for example, be in the form of longitudinal ribs adapted to the ribs 18 of the belt 17, said ribs 18a sliding between the longitudinal ribs 18 of the belt. This can in particular be seen in FIGS. 4, 8 to 10 when the locking member forming a bolt 10 is shown at a distance from the infusion unit 1 or having slid into locking position in relation to the belt 17 of said unit 1.

The use of ribs 18 provided on the belt 17 is a particularly advantageous but non-limiting feature of the present invention. Thus, the longitudinal reinforcement ribs 18 of the belt 17 of the infusion unit 1 previously described can also be used for producing the movement of the locking member or members forming bolts 10. Said ribs 18 therefore perform a dual function, the first being to reinforce the infusion unit 1 as previously mentioned and the second being to enable the movement of the locking members 10 associated to said unit 1.

Advantageously, the locking members forming bolts 10 are made from the same engineered plastic material as the ribs 18. It is also possible that the two locking members forming bolts 10, each on a lateral side of the belt 17, may form a single and the same totally symmetrical component.

During the infusion phases, the locking member or members forming bolts 10 are rigidly connected to the belt 17 and provide the holding thereof in relation to the receptacle 3 of the machine without increasing the space requirement of the infusion unit 1 the shape of which remains globally parallelepiped. The translational mobility of the locking member or members forming bolts 10 enables them to be retractable during the extraction of the infusion unit 1, said removal being carried out by actuation means 5 which will subsequently be described.

Figure 9:
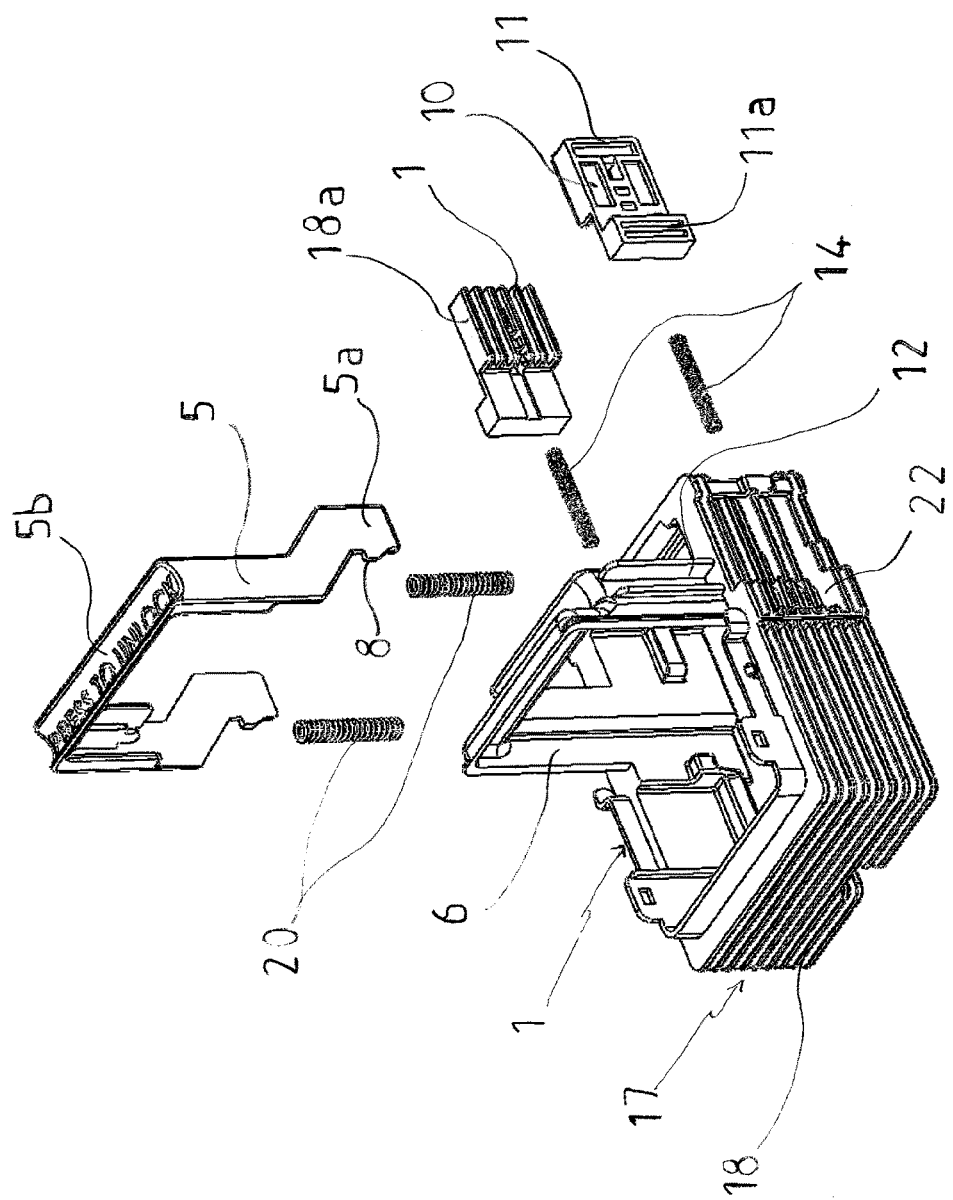
FIG. 9 is a perspective bird's eye view of an infusion unit forming part of the assembly according to the present invention, showing in particular the handle and the locking members of said unit with the respective vertical and horizontal return elements thereof, the locking members, the handle and the return elements thereof being illustrated spaced from said unit.
Figure 17:
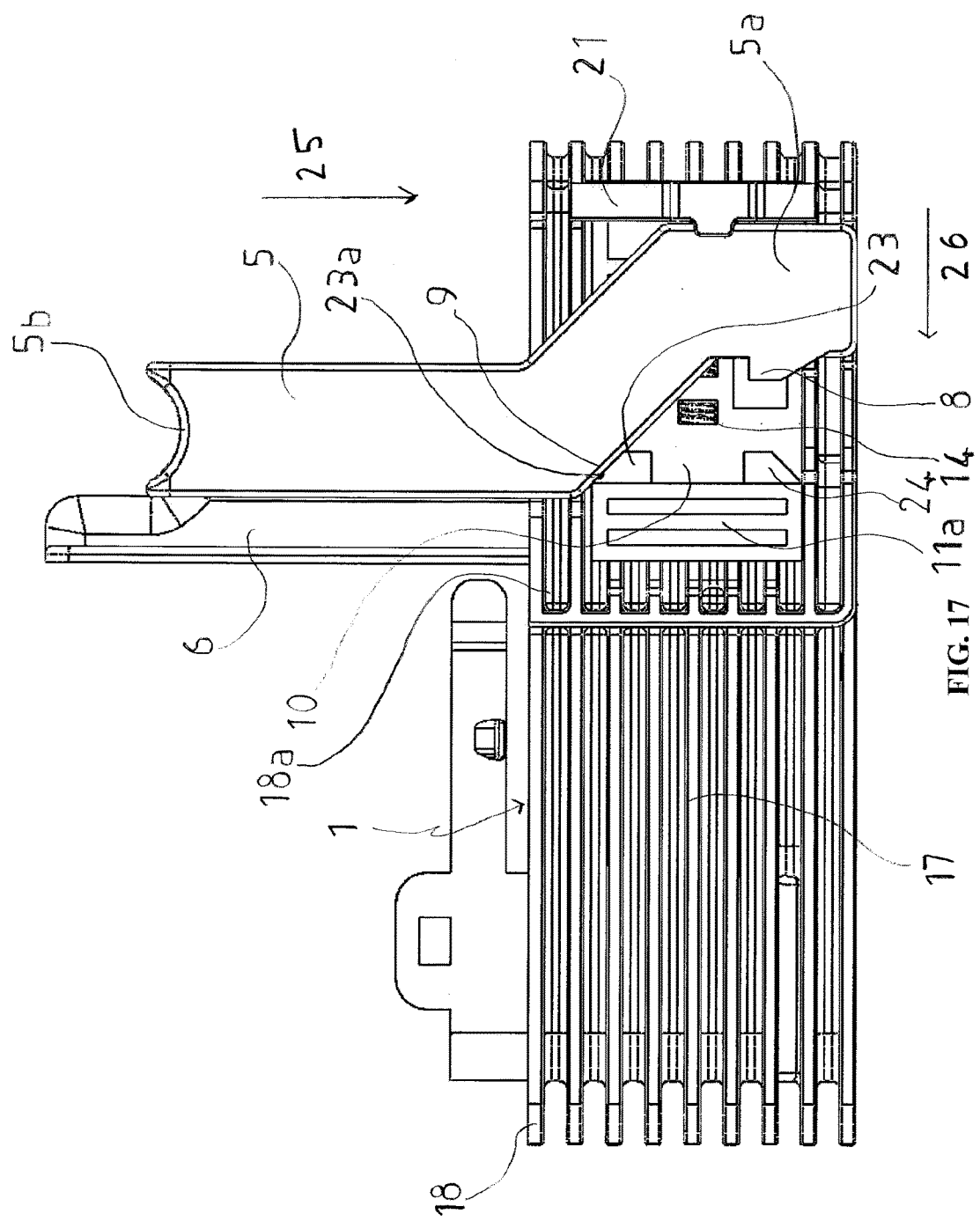
FIG. 17 is a lateral view of the portion of the unit shown in FIGS. 15 and 15, showing in particular a lower end of the handle more deeply lowered in the associated locking member than in said figures, the lowering of the handle having caused the locking member to unlock.
Figure 18:
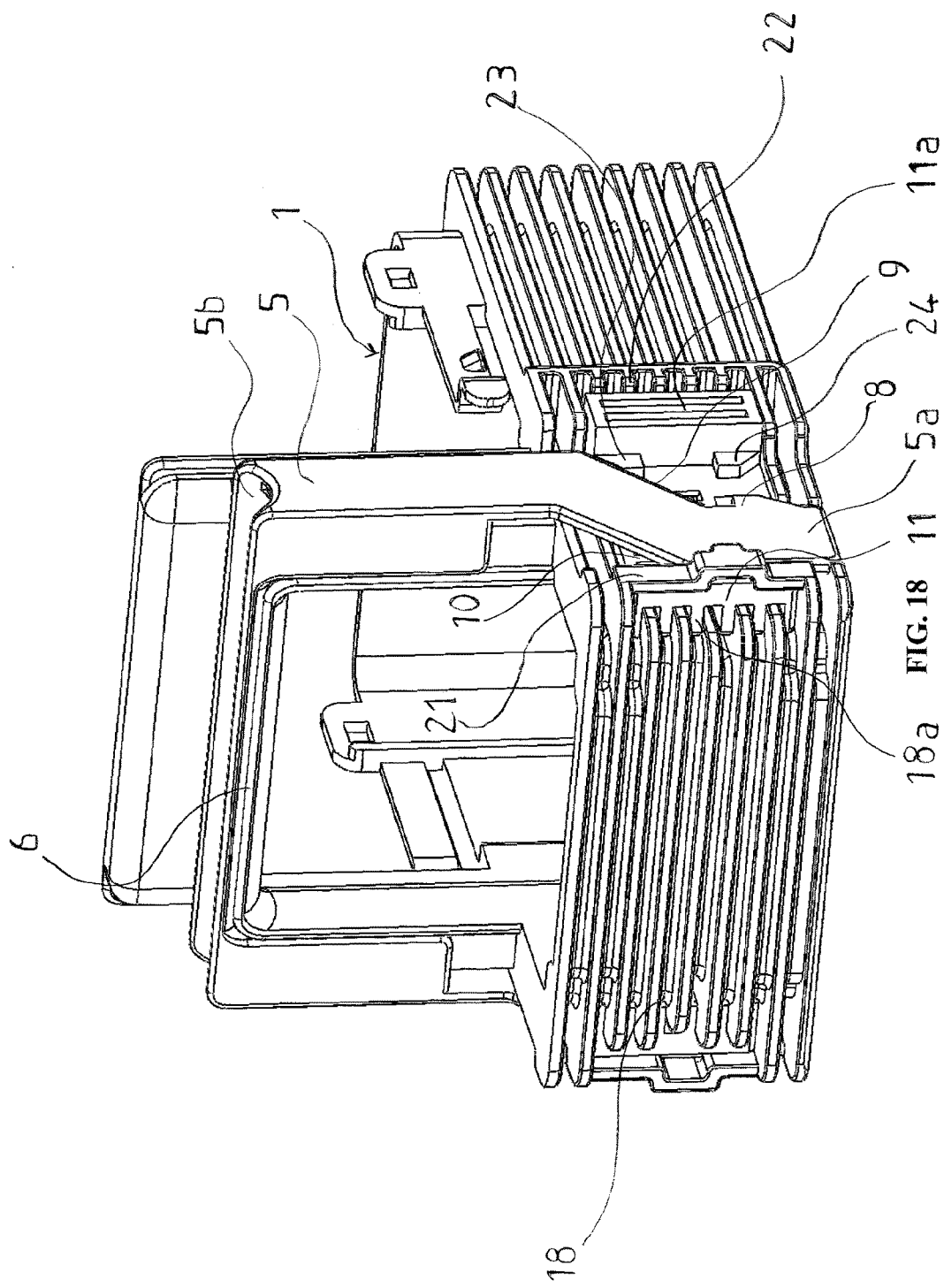
FIG. 18 is a perspective front view of the removable infusion unit forming part of the assembly according to the present invention, with the lower ends of the handle lowered deeply in the associated locking member in a position corresponding to that shown in FIG. 17, the locking members therefore having been brought back to rest position.
Figure 19:
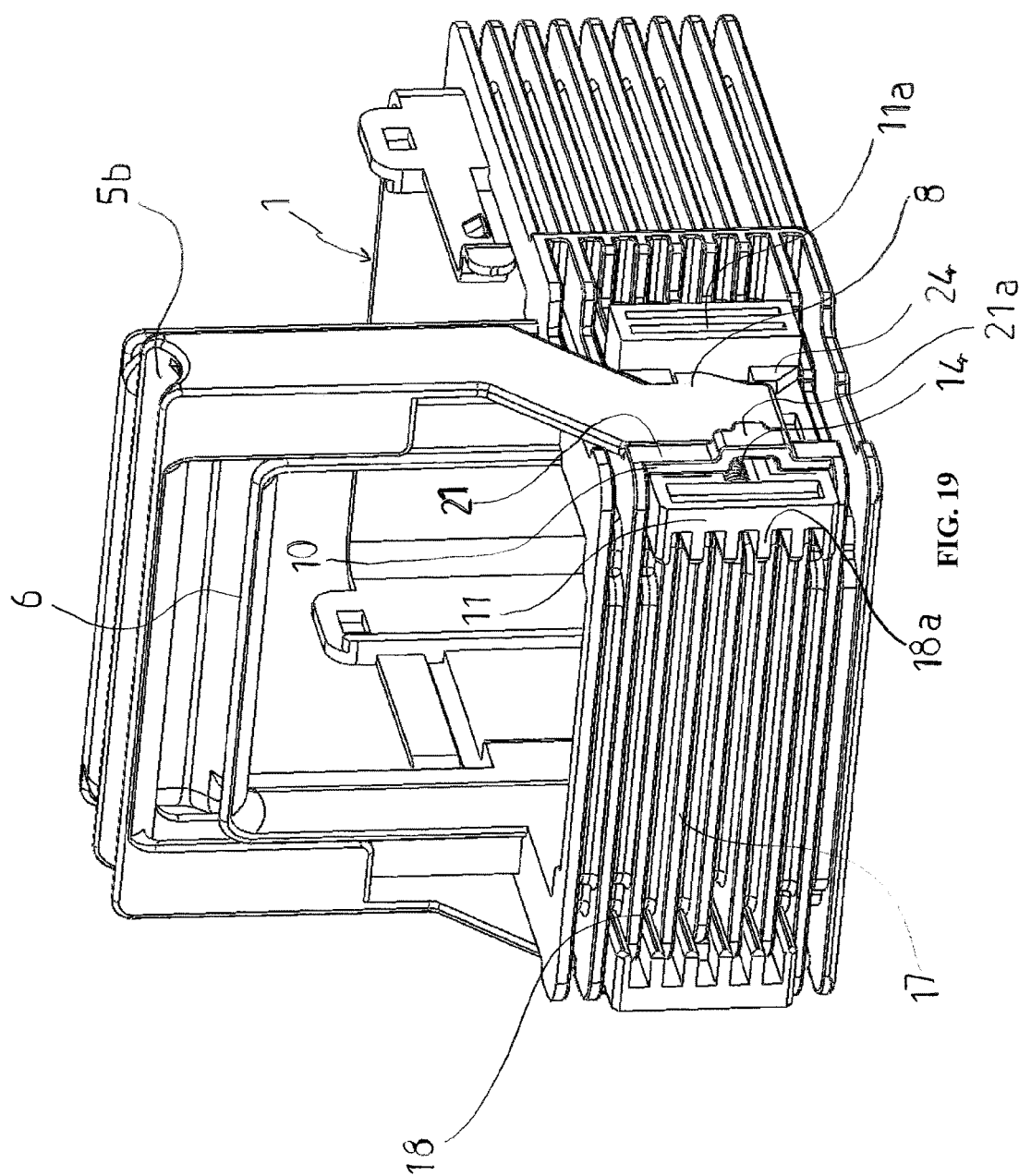
FIG. 19 is a perspective front view of the removable infusion unit forming part of the assembly according to the present invention, the lower ends of the handle being rigidly connected to the corresponding locking member, the locking members therefore being in position in which the infusion unit is locked onto the receptacle thereof not shown in said figure, said position of the handle and of the locking members being similar to that shown in FIG. 16.
Figure 20:
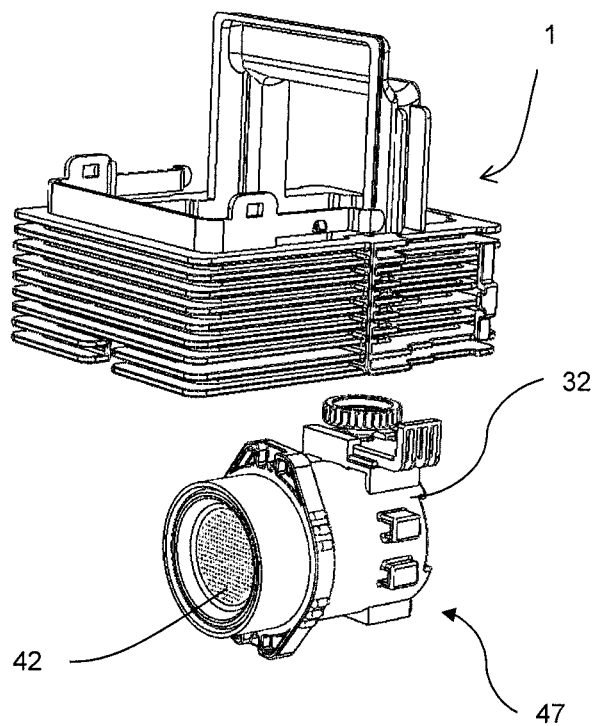
FIG. 20 is an isometric view of the removable infusion unit and the extraction chamber with the extraction chamber spaced from the infusion unit.
Figure 21:
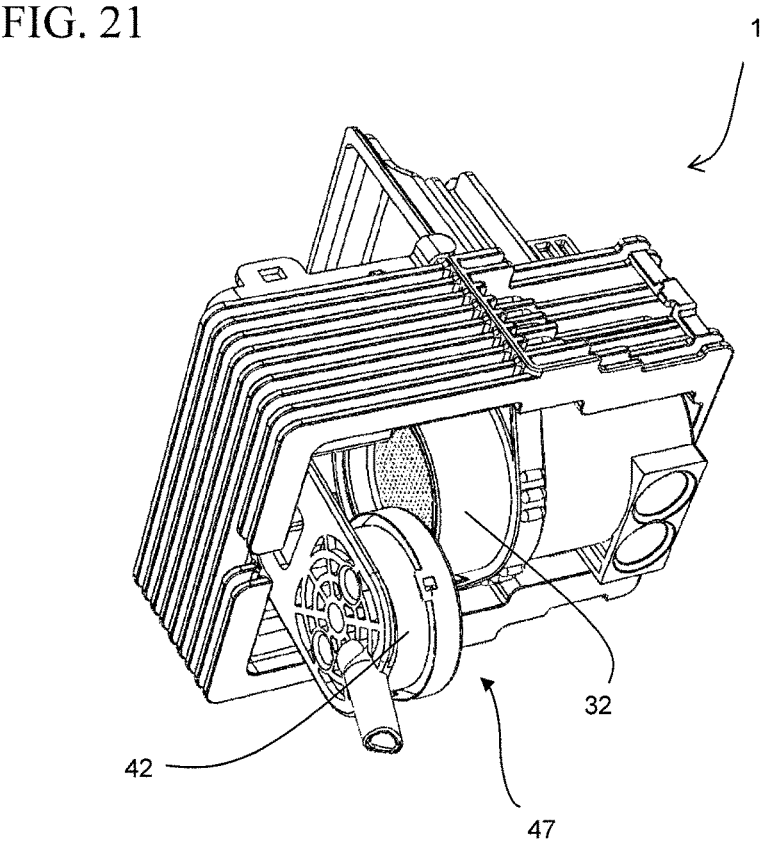
FIG. 21 is an isometric view of the removable infusion unit with the extraction chamber inserted therein and the mobile half chamber apart from the fixed half chamber.
Figure 22:
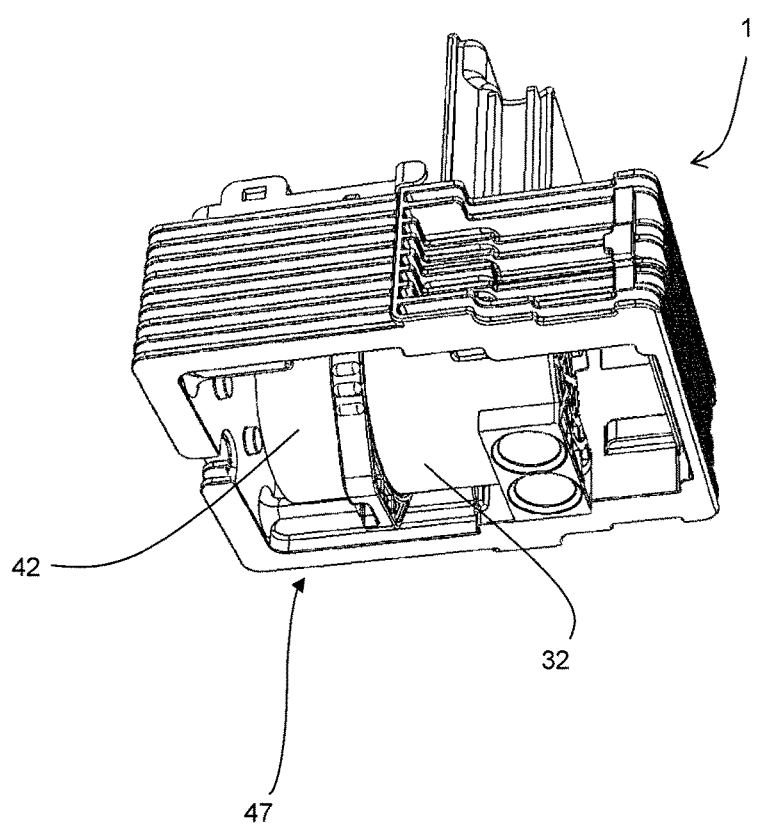
FIG. 22 is an isometric view of the removable infusion unit with the extraction chamber inserted therein and the mobile half chamber brought together with the fixed half chamber.

As particularly visible in FIGS. 9 and 17, advantageously a spring 14 is provided extending lengthwise of the lateral side of the infusion unit 1, i.e. substantially in horizontal direction when the assembly according to the invention lies on a horizontal plane, said spring 14 being located inside a locking member forming a bolt 10. The spring is inserted into the locking member forming a bolt 10 through an opening made therein and referenced 13 in FIGS. 4 to 5, said opening 13 communicating the outer surface of the member 10 with the inner surface thereof applied against the belt 17.

Figure 7:
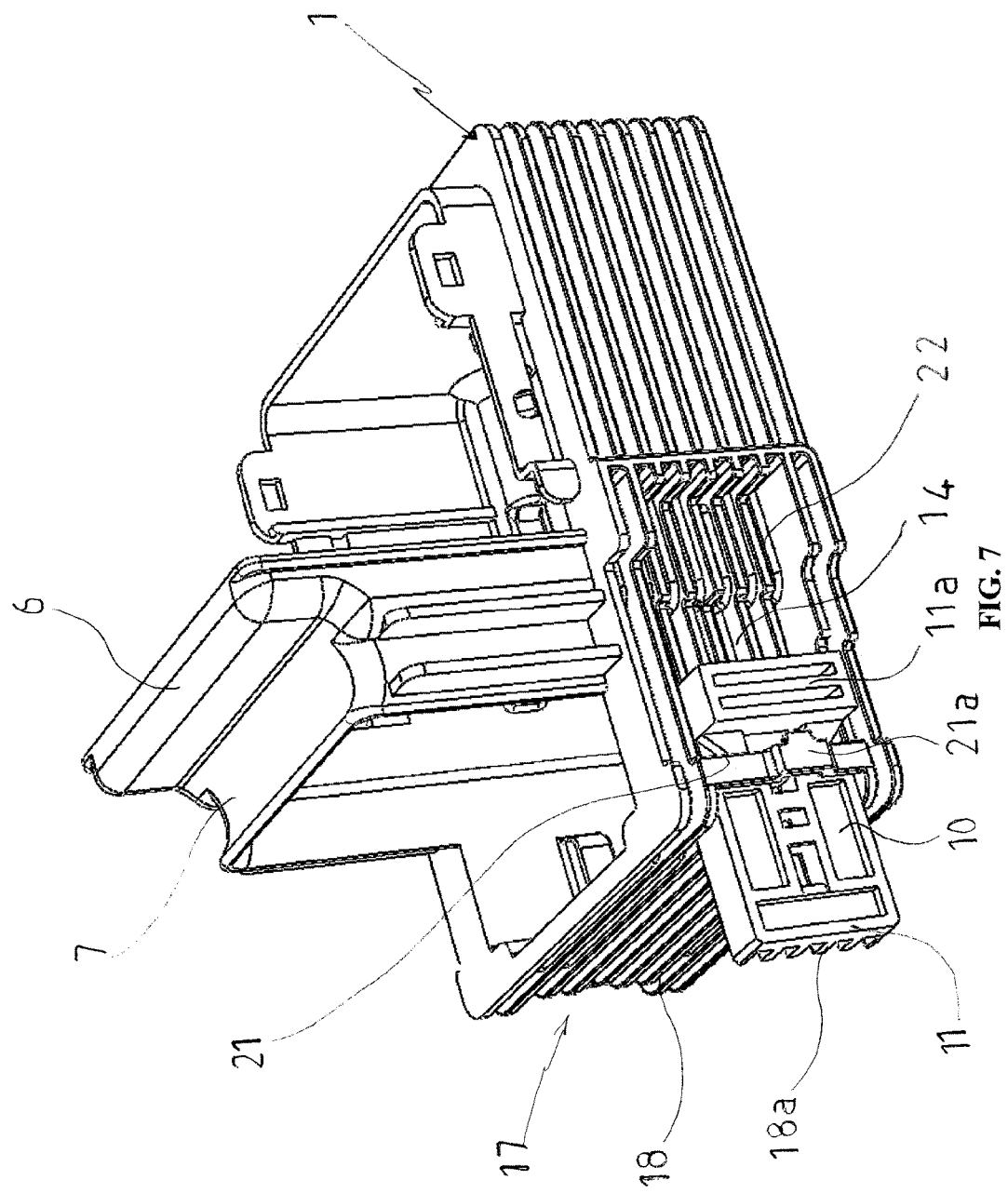
FIG. 7 is a lateral perspective view of the unit illustrated in FIG. 5 in a third position corresponding to locking of the unit in relation to the receptacle thereof.
Figure 8:
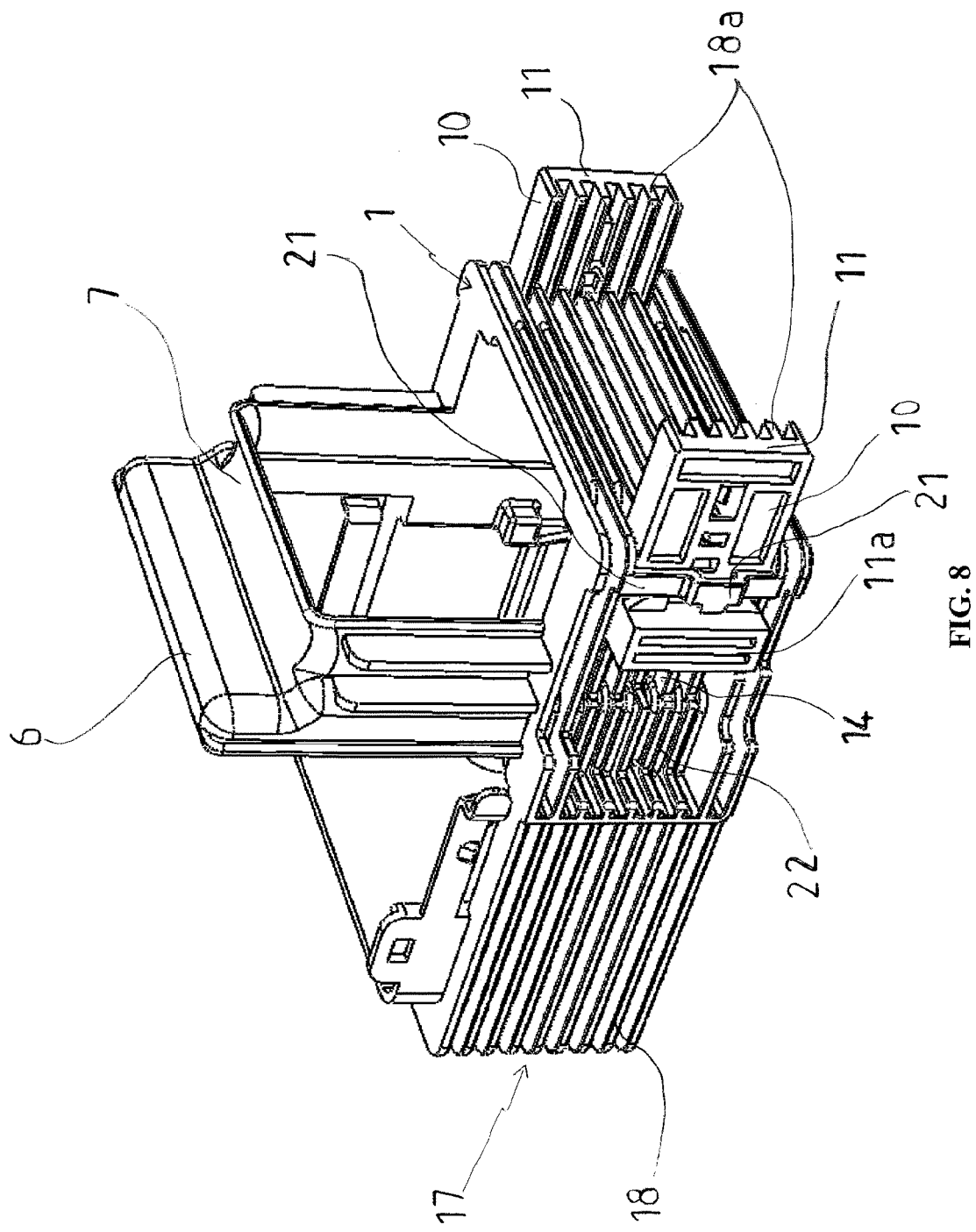
FIG. 8 is a perspective front three-quarter view of the infusion unit in the third position thereof corresponding to locking of the unit in relation to the receptacle thereof.
Figure 10:
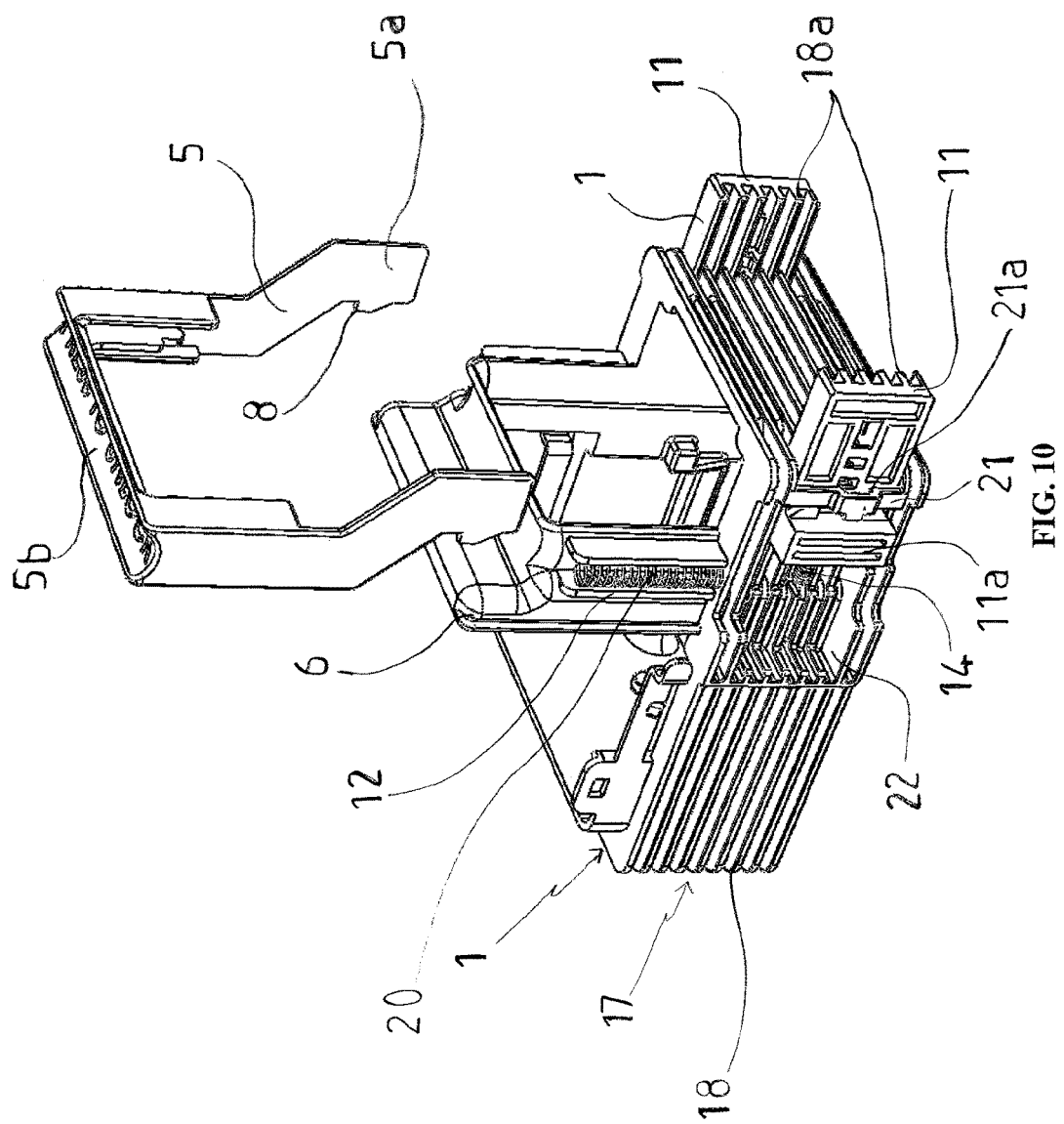
FIG. 10 is a perspective view according to the same angle as FIG. 8 of an infusion unit forming part of the assembly according to the present invention, the vertical and horizontal return elements being shown placed in position in said unit, the locking members in the locking position thereof and the handle being shown spaced from said unit.

As visible in particular in FIGS. 10 and 7, the spring 14 is intercalated between, on one hand, the portion of the locking member forming a bolt 10 the innermost to the housing 22, in said figures the rear face of the portion 11a projecting laterally from the locking member 10 and, on the other hand, an element of the housing 22 being located rearwards thereof, the spring 14 returning the locking member forming a bolt 10 to locked position.

The actuation means 5 will now be described.

As is visible in particular in FIG. 2, said actuation means include a control element in the form of a handle 5, said control element being used to release the locking means 10, 15 and 16 by means of action on the locking member 10 from the locked position thereof and thus disconnecting the infusion unit 1 from the receptacle thereof forming the support element of said unit 1. The actuation means are advantageously configured to be activated manually by the operator, preferably with a single hand.

The actuation means may also be associated to a gripping member 6 including towards the upper portion thereof a gripping surface 7. The control element, in the form of a handle 5 in FIGS. 1 to 3, 9 to 19 of the present application, may thus be advantageously associated with the gripping member 6 in order to perform the removal of the infusion unit 1 from the interior of the receptacle 3 when the locking means 10, 15, 16 are in unlocked position.

It should be noted that the actuation means supported by the infusion unit do not necessarily include a handle as a control element although this is the case in FIGS. 1 to 3, 9 to 19 of the present invention. The actuation means may, for example, thus include a control element, for example a button intended to be pulled, pressed or rotated, said control element being hinged onto the infusion unit and advantageously configured to participate, at least partially, in the gripping of the unit in view of the separation thereof from the receptacle.

As can be seen in particular in FIGS. 1 to 3, 9 to 19, the handle 5 is advantageously in the form of an upside-down U-shape, the free ends 5a of the U-shape pointing towards the receptacle 3, said receptacle only being visible in FIGS. 1 to 3, in mounted position of the handle 5 on the infusion unit 1. The handle 5 thus extends perpendicularly in the plane formed by the bottom of the infusion unit 1 or of the receptacle 3 respectively supporting the inner space 2 or 4 thereof. The handle 5 is vertically mobile, i.e. perpendicularly with the plane formed by the bottom of the infusion unit 1 or by that of the receptacle 3 thereof. The base of the upside-down U-shape is used as a head 5b forming a gripping surface for the handle 5 and it is on the head 5b that the operator presses or pulls to cause the handle 5 to move, as will subsequently be seen.

The free lower end 5a of the handle 5 is received in the recess 22 made in the belt 17, said recess 22 also being used for receiving a locking member forming a bolt 10. Thus, said member 10 and the handle 5 may be housed together in the recess 22 provided in the belt 17 not projecting laterally from the belt. The belt 17 also includes a transverse post 21 the substantially median portion of which has a lug 21a oriented towards the rear of the infusion unit 1 in order to laterally hold the handle 5 in relation to the infusion unit 1.

In front of each free lower end 5a of the handle 5, said handle has an inclined portion the sides of which, instead of being substantially vertical like the sides of the rest of the handle 5, extend with an inclination in relation to the vertical. One of the sides of said inclined portion forms an inclined surface 9 with which engages a complementary locking member forming a bolt 10, as will subsequently be seen.

Each free end 5a therefore has a vertical median axis that is slightly offset in relation to the vertical axis of the rest of the branch of the U-shape corresponding thereto. As is particularly visible in FIGS. 15 to 19, each free end 5a of the handle covers a portion of the outer surface of a locking member forming a bolt 10 and engages with the locking member forming a bolt 10 as will subsequently be explained.

The gripping member 6 also has a U-shape with the ends of the U-shape pointing towards the infusion unit 1 and being rigidly connected to the peripheral belt 17 of said unit 1. Said gripping member 6 is thus rigidly connected to the unit 1 and is used to remove the unit 1 out of the receptacle when an operator pulls the gripping member 6 vertically upwards.

Advantageously, the gripping member 6 and the handle 5 are adjacent to one another, the base of the U-shape forming the respective upper portion thereof located approximately at the same height, at least during the removal of the infusion unit 1 from the receptacle thereof as will subsequently be seen. Said two elements 5 and 6 are thus shaped such that an operator can grasp simultaneously and with a single hand the handle 5 and the gripping member 6.

The engagement of the actuation means 5 with the locking means 10 of the infusion unit 1 will now be described referring particularly to FIGS. 15 to 19. In the following, the activation of the actuation means corresponds to an action by the operator in order to perform the unlocking of the locking means whereas the deactivation of the actuation means corresponds to a position of the actuation means for which no action is exerted thereon in view of unlocking the locking means. The deactivation of the actuation means should not be taken in the strict sense, given that said deactivation stops automatically as soon as the operator performs a movement of the control element in view of unlocking the locking means.

The handle 5 representing in FIGS. 15 to 19 the control element of the actuation means includes a safety notch 8, said safety notch 8 extending laterally to the belt 17 moving away from the front end 11 of the locking member forming a bolt 10. Said safety notch 8 has the advantage of enabling the handle 5 to be mounted without tools and facilitating the in-plant assembly of the assembly including the infusion unit 1 and the maintenance thereof.

This safety notch 8 may be housed between an upper lug 23 and a lower lug 24 supported by the portion of the locking member forming a bolt 10 opposite, in the figures the lugs 23 and 24 being supported by the front face of the portion 11a projecting laterally from the locking member forming a bolt 10. This is produced when said member 10 is pushed forward in locking position as shown in FIG. 16.

The upper lug 23 of the member 10 also accomplishes a function other than the function for blocking the safety notch 8 of the handle 5. The upper face thereof forms an inclined surface 23a and is resting against the inclined surface 9 opposite supported by the handle 5 which is used as an inclined sliding ramp.

Figure 16:
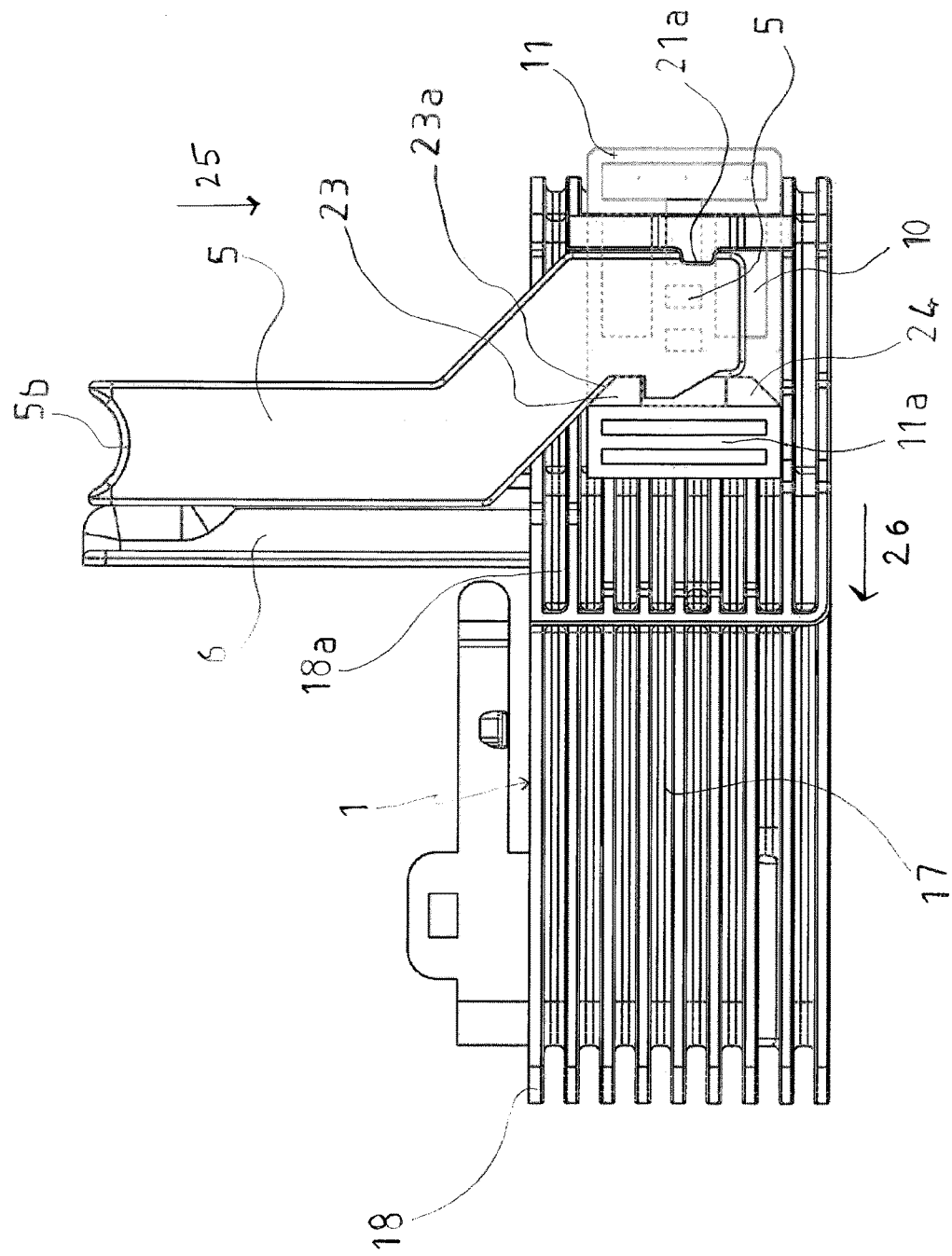
FIG. 16 is a lateral view of the portion of the unit shown in FIG. 15, showing in particular a lower end of the handle and the corresponding locking member thereof, this in a position in which the lower end of the handle is rigidly connected with the respective locking member, the locking members therefore being in locking position.

In the position shown in FIG. 16, the safety notch 8 is resting against the lower face of the upper lug 23 of the member 10. In said position, the handle 5 can no longer be moved vertically upwards without driving the infusion unit 1 locked onto the receptacle thereof. The inclined surface 9 is abutting against the upper lug 23 and the locking member forming a bolt 10 is in the locking position thereof with the front end 11 thereof projecting towards the front of the infusion unit 1 to be received in a housing of the receptacle.

Starting from said position shown in FIG. 16, when a vertical downward pressure according to the arrow 25 is performed by the operator on the head 5b of the handle 5, the inclined surface 9 arranged on the side of the handle 5 the innermost to the infusion unit 1 rests on the inclined surface 23a of the upper lug 23 of the member 10. The inclination of the surfaces 9 and 23a is such that the locking member forming a bolt 10 is thrust towards the rear of the infusion unit 1 in a position for unlocking the member and therefore releasing the infusion unit 1 from the receptacle receiving said unit.

Thus, a vertical sliding of the handle 5 towards the bottom of the infusion unit 1 according to the arrow 25 results in a sliding of the locking member 10 in a direction perpendicular to that of the handle 5, i.e. horizontally and towards the rear of the unit 1, said direction being designated by the arrow 26, as shown in FIGS. 16 and 17.

FIG. 17 shows said unlocking position with a handle 5 lowered in the locking member 10. The inclined surface 23a of the lug 23 has slid along the associated inclined surface 9 of the handle 5 due to the lowering of the handle 5 in the infusion unit 1. The lower ends 5a of the handle 5 are therefore located more deeply embedded into said infusion unit 1 than they were in the position illustrated in FIG. 16. The safety notch 8 of the handle 5 is no longer located between the upper 23 and lower lugs 24 of the locking member 10.

Thus, the infusion unit 1 is arranged such that a pressure applied on the handle 5 allows unit 1 to be disconnected from the receptacle. The handle 5 is therefore in an activation position which allows the infusion unit 1 to be disconnected from the receptacle. A tension exerted on the handle 5 and/or gripping member 6 is therefore sufficient for separating the infusion unit 1 from the receptacle thereof, the safety notch 8 of the handle 5 no longer abutting against the lower face of the upper lug 23 of the locking member forming a bolt 10.

Figure 11:
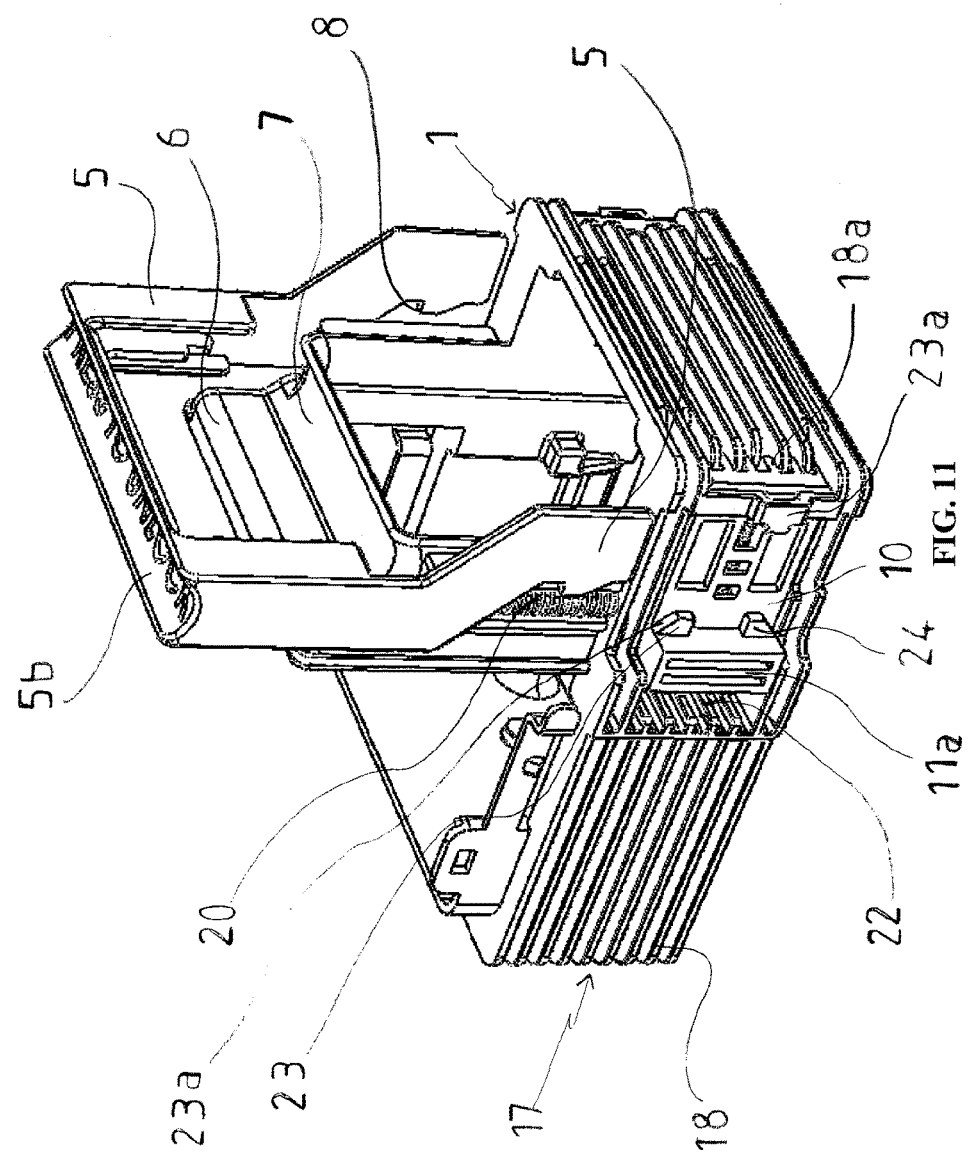
FIG. 11 is a perspective view according to the same angle of view as FIG. 10 of an infusion unit forming part of the assembly according to the present invention, the handle being shown not inserted into the belt of the infusion unit and the locking members being shown in the return position thereof.

As is particularly visible in FIGS. 9 to 11, a return means is configured to bring the actuation means back in top position when they are not activated, i.e. when no downward pressure is exerted thereon. Thus, according to one embodiment of the invention, two vertical springs 20 are provided which push the handle 5 in top position as shown in FIG. 16, said two vertical springs 20 only enabling the handle 5 to take the bottom position that said handle occupies in FIG. 17 only when a pressure from top to bottom is exerted thereon by an operator.

Figure 15:
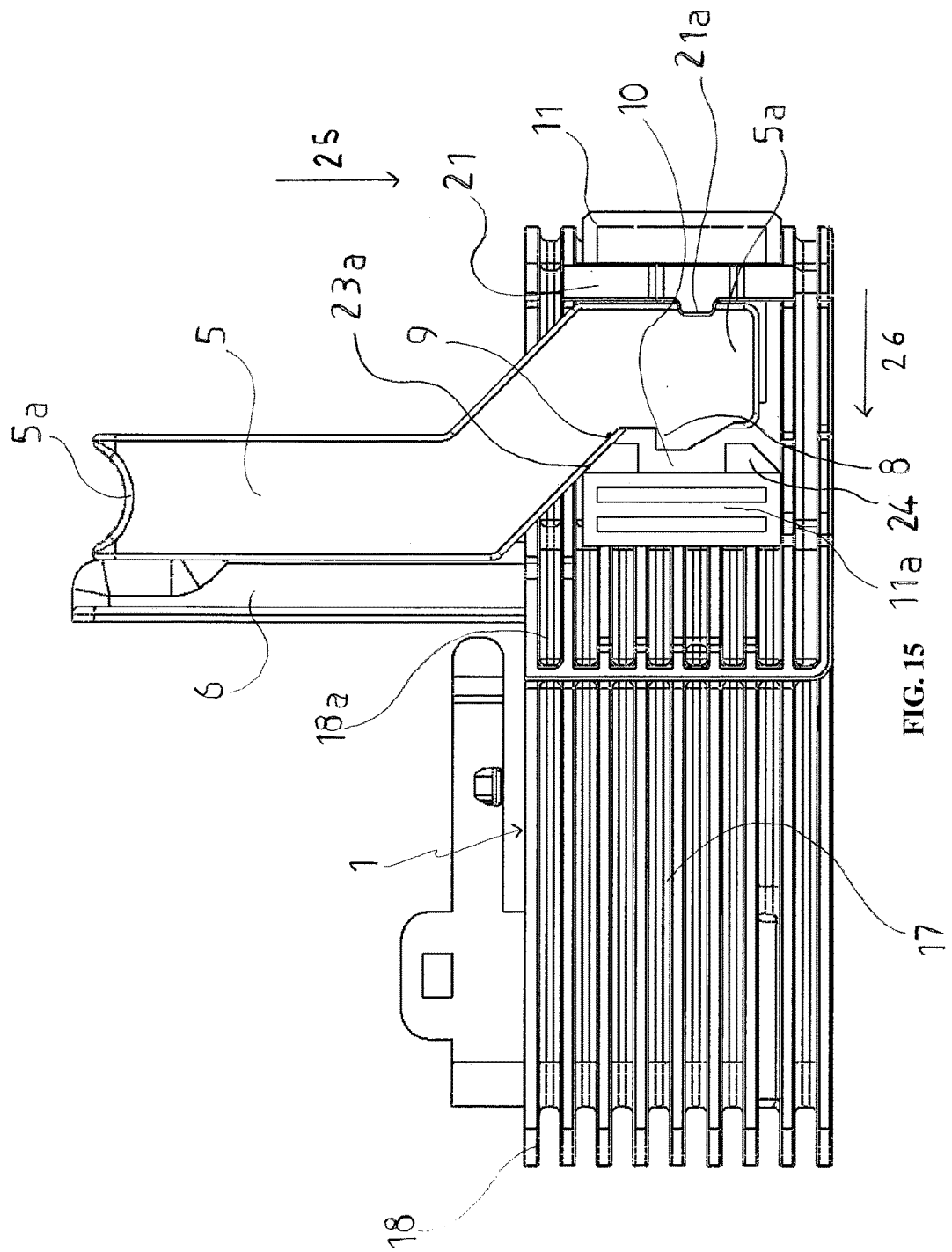
FIG. 15 is a lateral view of a portion of the infusion unit forming part of the assembly according to the present invention, showing in particular the lower end connection of the handle with the corresponding locking member, this in an intermediate lower position of the handle, with the locking members not yet in locked position.

FIG. 15 illustrates an intermediate position between a locking of the locking member 10 corresponding to a top position of the handle 5 as shown in FIG. 16 and an unlocking of the locking member corresponding to a bottom position of the handle 5 as shown in FIG. 17. In FIG. 15, the handle 5 is in a position lower than that shown in FIG. 16. The positions of the handle 5 and of the locking member 10 shown in said FIG. 15 are only temporary, given that if pressure force is applied on the handle 5, said handle will go back up under the action of the vertical spring 20 thereof shown in FIGS. 9 to 11 and of the horizontal return spring 14 shown in FIGS. 9 and 10, said spring pushing the locking member 10 towards the locking position thereof, the horizontal sliding of the locking member 10 making the handle 5 slide upwards to arrive in the position shown in FIG. 16. Conversely, if a pressure force is applied being greater than the return forces, the handle 5 will lower and will push the locking member 10 into the complete unlocking position thereof, as shown hi FIG. 17.

As is particularly visible in FIG. 10, on each U-shaped branch formed by the gripping member 6 is provided a chute 12 arranged for the housing of a vertical spring 20, said chute 12 holding the spring 20 in vertical position. Thus, referring to FIG. 9, the action of the handle 5 on the locking member forming a bolt 10 is reversible when exposed to the vertical spring 20 of the handle 5, pushing said handle 5 in position for locking said member 10 and when exposed to the horizontal spring of the member 10 pushing said member in position for locking the infusion unit 1 onto the receptacle thereof. Thus, the top position of the handle 5 corresponds to a deactivation of the actuation means that said position constitutes, the locking member 10 therefore being in locking position by means of the associated spring 14 thereof.

As regards said FIG. 10, it should be noted that the locking members forming bolts 10 are shown in said figure in a position projecting from the belt 17 with an amplitude which is not reached during locking in normal operation. Indeed, in normal operation, the lower ends 5a of the handle therefore inserted into the housing 22 make the members 10 abut against such an advance. This is not the case in FIG. 10 given that the handle 5 is shown separated from the infusion unit 1 and not in place on said unit 1. The locking position of said locking members forming bolts 10 can be seen in particular in FIGS. 14, 16 and 19.

Advantageously, as is particularly visible in FIGS. 4 to 11, the gripping surface 7 of the gripping member 6 is not located at the very top of the gripping member 6 but a little lower than said member in order to be substantially at the same height as the head 5b of the handle 5 during the action for removing the infusion unit 1. The gripping surface 7 thus forms a substantially horizontal bearing extending at a distance from the top of the gripping member 6.

Figure 12:
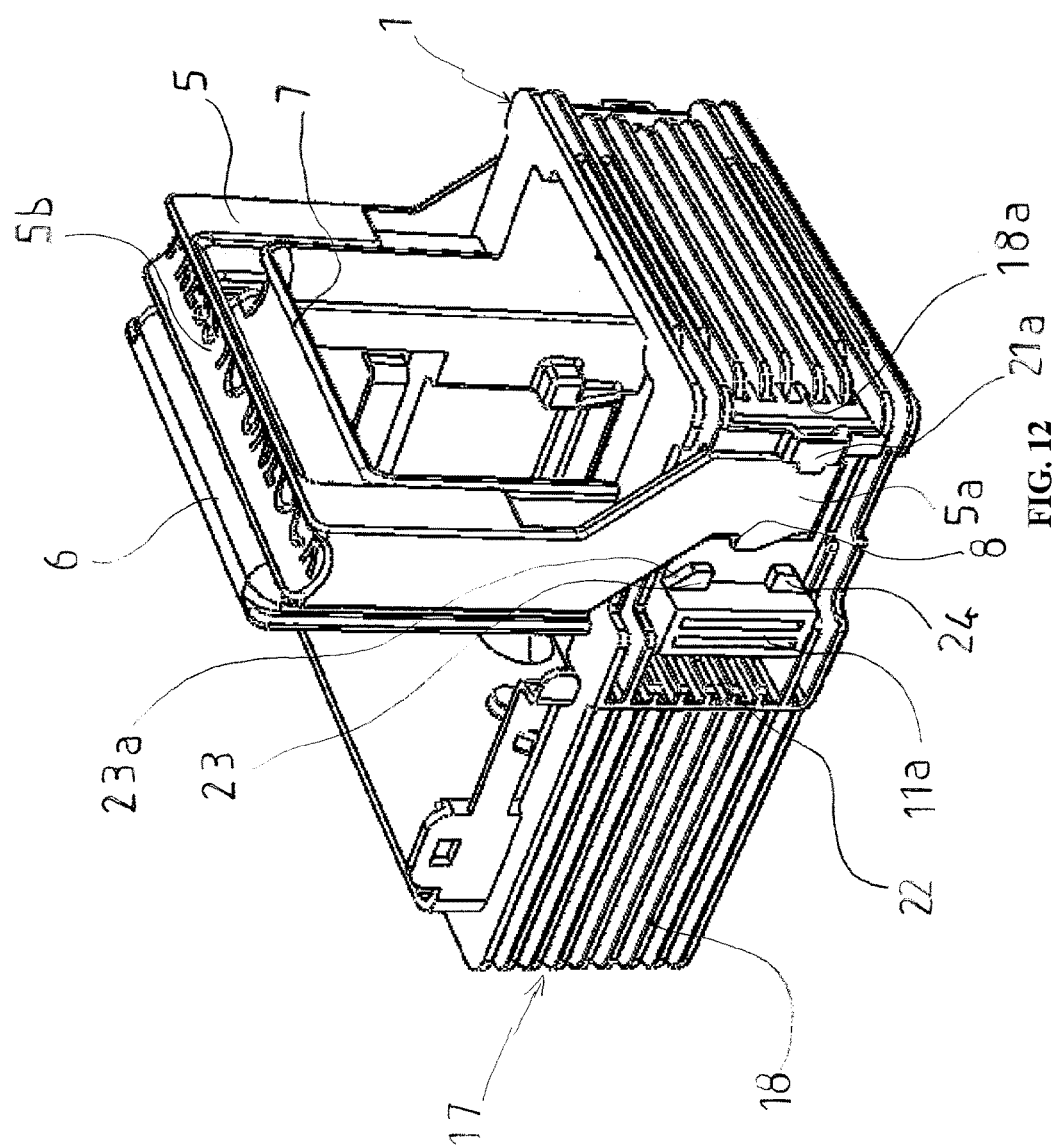
FIG. 12 is a perspective view according to the same angle of view as FIG. 10 of an infusion unit forming part of the assembly according to the present invention, the handle being shown inserted into the belt of the infusion unit in an intermediate working position with the lower ends thereof housed in the locking member, the locking members being shown in the return position thereof.
Figure 13:
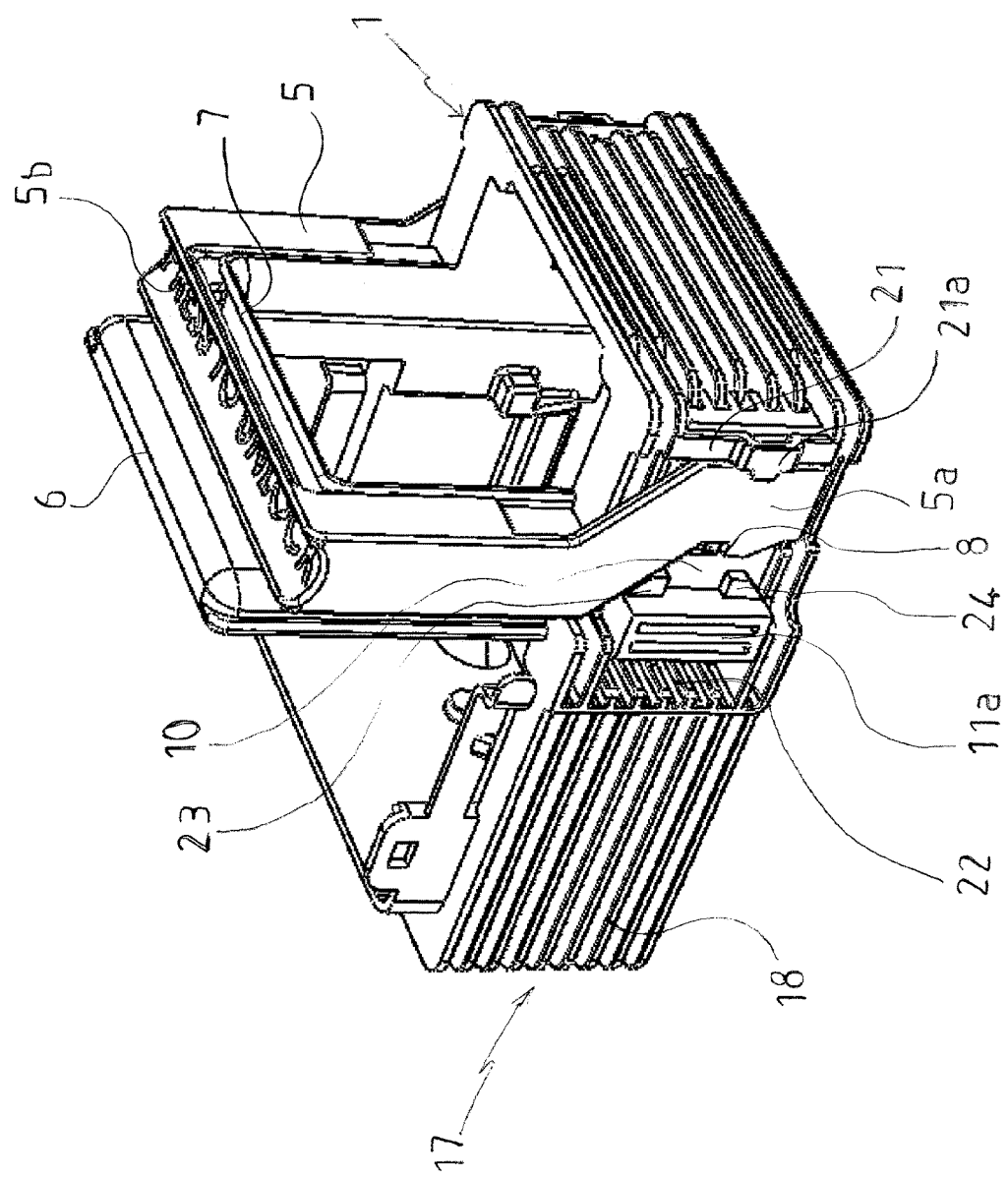
FIG. 13 is a perspective view according to the same angle of view as FIG. 10 of an infusion unit forming part of the assembly according to the present invention, the handle being shown in the activation position thereof corresponding to the actuation thereof for the unlocking of the locking members with the lower ends thereof housed in the locking member having been lowered in comparison to FIG. 12, the locking members being shown in the return position thereof.
Figure 14:
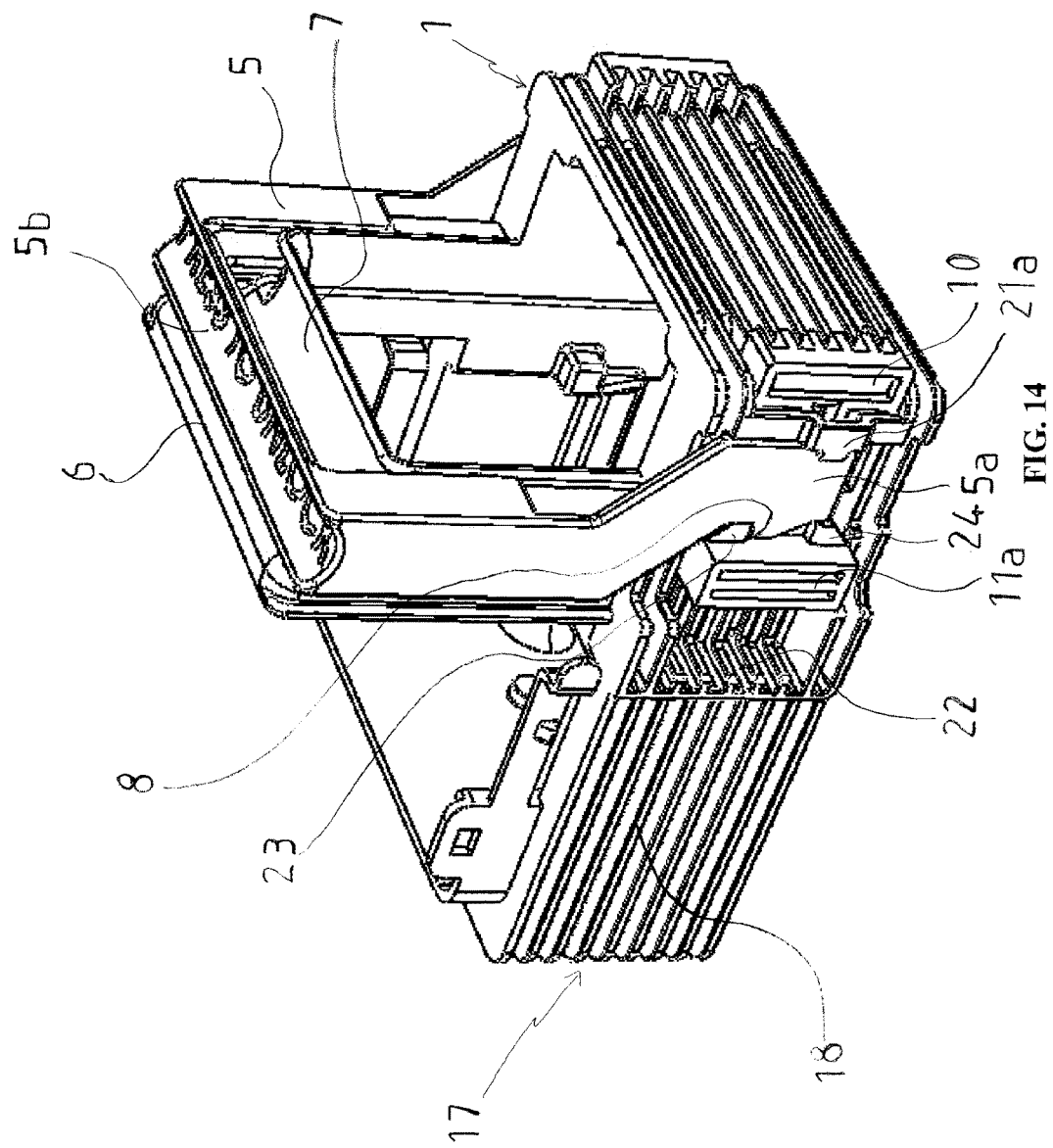
FIG. 14 is a perspective view according to the same angle of view as FIG. 10 of an infusion unit forming part of the assembly according to the present invention, the handle being shown in the deactivated position thereof with the lower ends thereof housed in the locking member, the locking members therefore being in a position in which the infusion unit is locked with rigid connection of the lower ends of the handle and of the respective locking member.

As regards FIG. 12, said figure shows a locking member 10 with the upper lug 23 thereof placed at a distance from the inclined surface associated with the handle 5. Such a position is rarely achieved during normal operation, given that the horizontal spring of the locking member 10 exerts on said member 10a return force in locked position and consequently pushes the upper lug 23 thereof abutting against the inclined surface of the handle 5.

The infusion unit 1 is arranged such that, during the passage from locking position to unlocking position, the respective gripping surfaces 5b and 7 of the handle 5 and of the gripping member 6 are located substantially at the same height. This can particularly be seen in FIG. 18. The gripping member 6 therefore forms an additional handle complementary to the handle 5 of the actuation means.

Thus, the actuation means according to the present invention may also fulfill, advantageously with the additional gripping means, the function of means for removing the infusion unit out of the receptacle thereof for a dismounting of the assembly.

As is visible in FIGS. 2 and 3, the receptacle 3 includes two hydraulic connectors 19, the infusion unit 1 including two complementary connectors in order to provide the hydraulic supply of the unit 1. Advantageously, the locking means formed, on one hand, from locking members forming bolts 10 and, on the other hand, locking members forming strikes 15 are distributed on either side of the connectors 19 thus preventing the infusion unit 1 from rotating when exposed to the pressure from the fluid supplying the unit 1. Said locking means, in particular the housings 16, are positioned on the walls of the receptacle 3 the farthest from the axis of symmetry separating the connectors 19. Said positioning increases the lever arm in relation to the axis of rotation around which unit 1 would have a tendency to rotate when exposed to the pressure. The invention thus enables a limited space requirement and weight to be maintained whilst offering good robustness.

It should be noted that with the exception of the springs 14 and 20, all of the components of the assembly may be made from injected plastic material, which reduces the manufacturing and assembly times and facilitates the end-of-life dismantling of the machine.

Advantageously, the receptacle 3 shown in FIGS. 1 to 3 is in turn housed in a receiving base provided in the machine, said receiving base not being shown in the figures. The receptacle 3 advantageously comprises removable rigid connection means arranged to provide the removable rigid connection with said receiving base of the machine.

The present invention thus offers a robust and inexpensive solution for facilitating the manufacture and the dismantling of end-of-life machines.

The invention is not limited to the embodiments described but applies to any embodiment complying with the spirit thereof.

| REFERENCES |
|---|
| 1. infusion unit |
| 2. hollow inner space of the unit |
| 3. receptacle |
| 4. hollow inner space of the receptacle |
| 5. handle |
| 5a. free end portion of the handle |
| 5b. head of the handle |
| 6. gripping member |
| 7. gripping surface of the member |
| 8. safety notch of the handle |
| 9. inclined surface supported by the handle |
| 10. locking member forming a bolt |
| 11. front end of the member of the bolt |
| 11a. portion projecting laterally from the bolt |
| 12. chute |
| 13. opening for inserting the spring |
| 14. horizontal return spring |
| 15. first housing forming a bolt |
| 16. second housing forming a bolt |
| 16a component having a cut-out forming a second housing |
| 17. peripheral belt |
| 18. longitudinal ribs of the belt |
| 18a. longitudinal ribs of the bolt |
| 19. vertical connector |
| 20. vertical return spring for a handle |
| 21. transverse post of the belt |
| 21a. lug |
| 22. recess |
| 23. upper lug |
| 23a. inclined surface |
| 24. lower lug |
| 25. downward direction of the handle |
| 26. removal direction of the bolt |
| 100. assembly |

What is claimed is:

1. An assembly for a machine for preparing beverages by extraction of a product to be infused contained in a dose comprising:

a unit for receiving the dose and infusing the product contained in the dose, the unit being at least equipped with an extraction chamber, the extraction chamber including two half-chambers capable of being mutually moved closer or farther apart for respectively closing or opening the extraction chamber, and a device for opening and closing the extraction chamber, characterised in that said assembly includes a receptacle configured to be rigidly connected to the machine and configured to removably receive the unit, in that said assembly includes a locking device for locking the unit onto the receptacle, said locking device comprising at least one locking member slidably mounted onto the unit and at least one complementary locking member supported by the receptacle, and an actuation device which is configured to be activated manually by the operator and supported by the unit and which controls the locking member, the locking member being slidably mounted with regard to the actuation device and in that said assembly is arranged such that:

in a first position in which the actuation device is deactivated, an engagement of the locking member with the associated complementary locking member producing a rigid connection of the unit in relation to the receptacle so that the locking device prevents the unit from being disconnected from the receptacle, in a second position in which the actuation device is activated, the locking device allows the unit to be disconnected from the receptacle, wherein to pass from the first position to the second position, the locking member slides in a first sliding direction to disengage from the complementary locking member, wherein to pass from the second position to the first position the locking member slides in a second direction, contrary to the first sliding direction, to engage the complementary locking member;

wherein the actuation device includes a manual control element configured to be pulled to cause the actuation of the actuation device, said control element being slidably mounted on the unit in a direction different from the first and second directions, the sliding movement of the control element resulting in the sliding of the locking member, and said control element being configured to participate, at least partially, in the gripping of the unit in view of the separation thereof from the receptacle, wherein the assembly comprises a gripping member fixedly attached to the unit, and shaped such that the operator can grasp simultaneously and with a single hand the control element and the gripping member to achieve the separation, from the receptacle, of the unit equipped with the extraction chamber including the two half-chambers.

2. The assembly according to claim 1, wherein the locking member forms a bolt supported by the unit whereas the complementary locking member thereof forms a strike supported by the receptacle.

3. The assembly according to claim 1, wherein the unit includes two locking members and two complementary locking members, wherein the two locking members each form bolts supported by the unit whereas the complementary locking members thereof form strikes supported by the receptacle and wherein the unit includes a peripheral belt surrounding the infusion unit, said peripheral belt supporting the two locking members that each form the bolts, said bolts being symmetrically arranged on the belt.

4. The assembly according to claim 3, wherein the belt includes ribs extending in the sliding direction and the locking member forming the bolt includes raised patterns that are complementary to the ribs and configured to provide the translational guidance of the locking member forming the bolt on the belt.

5. The assembly according to claim 1, wherein the unit includes at least one hydraulic connector and the receptacle includes at least one complementary connector to provide a hydraulic supply of the unit, the connector of the unit and the complementary connector of the receptacle being shaped to define a thrust direction for a pressurized fluid injected into the unit, the at least one locking member being configured to slide in a direction perpendicular to the thrust direction.

6. The assembly according to claim 1, wherein the unit is configured to be supplied with pressurized fluid and a pressurized fluid supply generates on the unit a thrust force in a thrust direction, the assembly is configured to be shaped so that the locking member and the complementary locking member engage such that said thrust force tends to move closer the locking member and the complementary locking member.

7. The assembly according to claim 1, wherein the unit includes the actuation device configured to move closer and/or farther apart the two half-chambers.

8. The assembly according to claim 1, wherein the control element is a handle configured to be moved during the actuation thereof and including a first inclined surface arranged to engage with a second inclined surface supported by the associated locking device such that the movement of the handle results in a movement of the locking device.

9. The assembly according to claim 8, wherein the handle is slidably mounted onto the unit and configured such that a sliding of the handle results in a sliding of the associated locking device in a direction perpendicular to the handle.

10. The assembly according to claim 1, wherein the unit is arranged such that a pressure applied on the control element allows the unit to be disconnected from the receptacle and that a tension exerted manually on the gripping member by the operator separates the unit from the receptacle.

11. The assembly according to claim 1, wherein the unit is arranged such that during the passage from the first position to the second position, the portion of the control element activated by the operator moves closer to a gripping surface provided on the gripping member.

12. The assembly according to claim 11, wherein the gripping surface forms an additional handle complementary to the control element of the actuation device.

13. The assembly according to claim 1, including a return device configured to bring the locking device or the actuation device respectively to the first position in which the actuation device is deactivated and the locking member is engaged.

14. A method for assembling an assembly comprising the steps of:
providing the assembly according to claim 1;
activating the actuation device such that the locking device allows the unit to be disconnected from the receptacle;
placing the unit on or in the receptacle;
deactivating the actuation device such that the locking device prevents the unit from being disconnected from the receptacle.

* * * * *